United States Patent [19]

Perg et al.

[11] Patent Number: 5,237,500
[45] Date of Patent: Aug. 17, 1993

[54] SYSTEM AND PROCESS FOR CONVERTING CONSTANT DOLLAR FINANCIAL INSTRUMENTS

[75] Inventors: Wayne F. Perg; Lyndel D. Brumley, both of Phoenix, Ariz.

[73] Assignee: RealValue Corporation, Phoenix, Ariz.

[21] Appl. No.: 485,543

[22] Filed: Feb. 27, 1990

[51] Int. Cl.$^5$ .............................................. G06F 15/21
[52] U.S. Cl. .................................................... 364/408
[58] Field of Search ........................................... 364/408

[56] References Cited

U.S. PATENT DOCUMENTS

| | | | |
|---|---|---|---|
| 4,642,768 | 2/1987 | Roberts | 364/408 |
| 4,648,038 | 3/1987 | Roberts et al. | 364/408 |
| 4,722,055 | 1/1988 | Roberts et al. | 364/408 |
| 4,739,478 | 4/1988 | Roberts et al. | 364/408 |
| 4,742,457 | 5/1988 | Leon et al. | 364/408 |
| 4,752,877 | 6/1988 | Roberts et al. | 364/408 |

OTHER PUBLICATIONS

"Purchasing-Power Mortgages-New Loan Plan Offers Hope In An Inflation" McDonough, William R., Business Review, Sep. 1975, pp. 1–7.
"The Taxation and Marketing of Price-Level Adjusted Mortgages", Knoll, Michael S., The Journal Of Real Estate Taxation, pp. 291–309.
"Why Are So Few Financial Assets Indexed to Inflation", Weiner, Stuart E. Economic Review, May, 1983 pp. 3–18.
"Indexed Mortgage Pass-Throughs" Sharplin, Arthur D., Pension World, Nov., 1982, pp. 30–33.
"Pivotal Issues", Sharplin, Arthur D., Indexed Lending's, Aug. 1983 pp. 57–63.
"Interest Rates Aren't Really High", Ranson, David, Fortune Jul., 1985
"Affordability and Inflation Protection", McCullock, J. Huston, Mortgage Banking, pp. 8–13.
"Real Estate Investment Analysis System", IBM Technical Disclosure Bulletin vol. 13, No. 11, Apr. 1971.
"Software Packages Assist Diverse Needs of Bond Portfolio Managers" Technical Data Corp. Jun., 1985 Wall Street Computer Review.

*Primary Examiner*—Gail O. Hayes
*Attorney, Agent, or Firm*—Banner, Birch, McKie & Beckett

[57] ABSTRACT

The present invention discloses a method and apparatus for converting constant-dollar financial instruments into equivalent nominal-dollar instruments. After the optimal form or forms of constant-dollar financial instruments have been determined for the purposes of financing a specific enterprise or activity, the data describing the constant-dollar financial instrument or instruments are entered into the system together with the specified inflation measure and the desired frequency of adjustments to the nominal-dollar interest rate and to the nominal-dollar payments. The data processing system puts the specified constant-dollar instrument or instruments into a standardized format and, given the desired frequency of inflation adjustments to be made to the nominal-dollar interest rate and to the nominal-dollar payments, the system specifies the equivalent nominal-dollar instrument or instruments in a standardized format. Every payment and/or compounding period the data processing system calculates the nominal-dollar interest rate(s), nominal-dollar payment(s), nominal-dollar call price(s), and remaining nominal-dollar principal balance for the equivalent nominal-dollar instrument or instruments.

52 Claims, 22 Drawing Sheets

216 — OUTPUT IN THE APPROPRIATE FORMAT:
1. THE CURRENT NOMINAL-DOLLAR RETURN.
2. THE CURRENT INTEREST (AND PENALTIES, IF ANY) DUE.
3. THE PAYMENT AMOUNT AND THE AMOUNT OF THE PAYMENT BEING UTILIZED FOR PAYMENT OF CURRENT INTEREST (AND PENALTIES, IF ANY).
4. THE CHANGE IN THE AMOUNT OF ACCRUED INTEREST FROM THE PRIOR PAYMENT PERIOD, IF APPLICABLE, AND THE NEW LEVEL OF ACCRUED INTEREST, IF ANY.
5. THE CHANGE IN THE OUTSTANDING LOAN BALANCE FROM THE PRIOR PAYMENT PERIOD, AND THE CURRENT LOAN BALANCE.
6. A LIST OF THE LOAN TERMS AND/OR COVENANTS, IF ANY, WITH WHICH THE LOAN IS NOT CURRENTLY IN COMPLIANCE, AND THE SUPPORTING DATA THEREFORE.
7. ALL CURRENT FINANCIAL DATA REQUIRED TO BE SUPPLIED BY THE BORROWER.
8. THE NOMINAL-DOLLAR RETURN FOR THE SUBSEQUENT PAYMENT PERIOD.
9. THE REQUIRED PAYMENT FOR THE SUBSEQUENT PAYMENT PERIOD.

FINISH

*FIG. 2C*

| | | | |
|---|---|---|---|
| PURCHASE PRICE: | | $10,000,000.00 | |
| LOAN AMOUNT: | | $7,500,000.00 | |
| NOI AT PURCHASE: | | $900,000.00 | |
| CAP RATE AT PURCHASE: | | 9.00% | |
| MARKET CAP RATE: | | 9.00% | |

| | (A) | (B) | (C) |
|---|---|---|---|
| YEAR | NOI OF PROPERTY CONSTANT DOLLARS | INFLATION RATE | NOI OF PROPERTY NOMINAL DOLLARS |
| 0 | $900,000.00 | 4.00% | |
| 1 | $900,000.00 | 4.00% | $936,000.00 |
| 2 | $900,000.00 | 4.00% | $973,440.00 |
| 3 | $900,000.00 | 4.00% | $1,012,377.60 |
| 4 | $900,000.00 | 4.00% | $1,052,872.70 |
| 5 | $900,000.00 | 4.00% | $1,094,987.61 |
| 6 | $900,000.00 | 4.00% | $1,138,787.12 |
| 7 | $900,000.00 | 4.00% | $1,184,338.60 |
| 8 | $900,000.00 | 4.00% | $1,231,712.15 |
| 9 | $900,000.00 | 4.00% | $1,280,980.63 |
| 10 | $900,000.00 | 4.00% | $1,332,219.86 |
| TOTAL | | | $11,237,716.27 |

| | (T) | (U) | (V) |
|---|---|---|---|
| YEAR | DEPRECIATION TAX-SHIELD 31.5 YEAR ST. LINE 20% LAND VALUE NOMINAL DOLLARS | LOAN-TO-VALUE BASED ON MARKET VALUE REAL VALUE MORTGAGE | CONVENTIONAL MORTGAGE |
| 0 | | 75.00% | 75.00% |
| 1 | $253,968.25 | 73.87% | 71.71% |
| 2 | $253,968.25 | 72.69% | 68.53% |
| 3 | $253,968.25 | 71.44% | 65.44% |
| 4 | $253,968.25 | 70.13% | 62.44% |
| 5 | $253,968.25 | 68.76% | 59.53% |
| 6 | $253,968.25 | 67.32% | 56.70% |
| 7 | $253,968.25 | 65.81% | 53.94% |
| 8 | $253,968.25 | 64.22% | 51.26% |
| 9 | $253,968.25 | 62.55% | 48.64% |
| 10 | $253,968.25 | 60.80% | 46.08% |
| TOTAL | $2,539,682.54 | | |

Fig.3A

|   (D)   |   (E)   |   (F)   |   (G)   |
|---|---|---|---|
| DEBT SERVICE NOMINAL DOLLARS | | PRE-TAX CASH-FLOW NOMINAL DOLLARS | |
| REAL VALUE MORTGAGE | CONVENTIONAL MORTGAGE | REAL VALUE MORTGAGE | CONVENTIONAL MORTGAGE |
| $487,184.64 | $789,814.41 | $448,815.36 | $146,185.59 |
| $506,672.03 | $789,814.41 | $466,767.97 | $183,625.59 |
| $526,938.91 | $789,814.41 | $485,438.69 | $222,563.19 |
| $548,016.47 | $789,814.41 | $504,856.24 | $263,058.29 |
| $569,937.13 | $789,814.41 | $525,050.49 | $305,173.20 |
| $592,734.61 | $789,814.41 | $546,052.51 | $348,972.70 |
| $616,444.00 | $789,814.41 | $567,894.61 | $394,524.19 |
| $641,101.76 | $789,814.41 | $590,610.39 | $441,897.73 |
| $666,745.83 | $789,814.41 | $614,234.81 | $491,166.22 |
| $693,415.66 | $789,814.41 | $638,804.20 | $542,405.44 |
| $5,849,191.02 | $7,898,144.13 | $5,388,525.25 | $3,339,572.14 |

|   (W)   |   (X)   |   (Y)   |   (Z)   |
|---|---|---|---|
| EQUITY IN PROPERTY CONSTANT DOLLARS | | EQUITY IN PROPERTY NOMINAL DOLLARS | |
| REAL VALUE MORTGAGE | CONVENTIONAL MORTGAGE | REAL VALUE MORTGAGE | CONVENTIONAL MORTGAGE |
| $2,500,000.00 | $2,500,000.00 | $2,500,000.00 | $2,500,000.00 |
| $2,612,885.76 | $2,828,548.94 | $2,717,401.19 | $2,941,690.89 |
| $2,731,415.81 | $3,146,955.78 | $2,954,299.34 | $3,403,747.37 |
| $2,855,872.37 | $3,455,765.81 | $3,212,468.02 | $3,887,266.56 |
| $2,986,551.75 | $3,755,513.03 | $3,493,843.13 | $4,393,419.06 |
| $3,123,765.10 | $4,046,721.11 | $3,800,537.88 | $4,923,454.99 |
| $3,267,839.12 | $4,329,904.53 | $4,134,858.99 | $5,478,710.55 |
| $3,419,116.84 | $4,605,569.51 | $4,499,324.50 | $6,060,615.29 |
| $3,577,958.44 | $4,874,215.14 | $4,896,683.19 | $6,670,699.98 |
| $3,744,742.13 | $5,136,334.33 | $5,329,935.70 | $7,310,605.33 |
| $3,919,865.00 | $5,392,414.94 | $5,802,357.76 | $7,982,091.40 |

*Fig.3B*

| (H) | (I) | (J) | (K) |
|---|---|---|---|
| DEBT-COVERAGE-RATIO | | CASH-ON-CASH RETURN BASED ON INITIAL EQUITY INVESTMENT | |
| REAL VALUE MORTGAGE | CONVENTIONAL MORTGAGE | REAL VALUE MORTGAGE | CONVENTIONAL MORTGAGE |
| 1.92 | 1.19 | 17.95% | 5.85% |
| 1.92 | 1.23 | 18.67% | 7.35% |
| 1.92 | 1.28 | 19.42% | 8.90% |
| 1.92 | 1.33 | 20.19% | 10.52% |
| 1.92 | 1.39 | 21.00% | 12.21% |
| 1.92 | 1.44 | 21.84% | 13.96% |
| 1.92 | 1.50 | 22.72% | 15.78% |
| 1.92 | 1.56 | 23.62% | 17.68% |
| 1.92 | 1.62 | 24.57% | 19.65% |
| 1.92 | 1.69 | 25.55% | 21.70% |

| (AA) | (AB) | (AC) | (AD) |
|---|---|---|---|
| TAX-LOSS CARRY-FORWARD NOMINAL DOLLARS | | AFTER-TAX OPERATING CASH FLOW NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | ($66,091.77) | $394,258.17 | $146,185.59 |
| $0.00 | ($90,377.97) | $407,184.05 | $183,625.59 |
| $0.00 | ($70,903.84) | $420,626.97 | $222,563.19 |
| $0.00 | ($5,606.90) | $434,607.60 | $263,058.29 |
| $0.00 | $0.00 | $449,147.46 | $275,019.85 |
| $0.00 | $0.00 | $464,268.92 | $303,165.03 |
| $0.00 | $0.00 | $479,995.23 | $333,950.93 |
| $0.00 | $0.00 | $496,350.59 | $365,838.12 |
| $0.00 | $0.00 | $513,360.17 | $398,857.03 |
| $0.00 | $0.00 | $531,050.13 | $433,037.85 |
| | | $4,590,849.29 | $2,925,301.46 |

Fig.3C

| (L) | (M) | (N) | (O) |
|---|---|---|---|
| CURRENT RETURN ON EQUITY IN THE PROPERTY | | MARKET VALUE OF THE PROPERTY CONSTANT DOLLARS | MARKET VALUE OF THE PROPERTY NOMINAL DOLLARS |
| REAL VALUE MORTGAGE | CONVENTIONAL MORTGAGE | | |
| 16.52% | 4.97% | $10,000,000.00 | $10,400,000.00 |
| 15.80% | 5.39% | $10,000,000.00 | $10,816,000.00 |
| 15.11% | 5.73% | $10,000,000.00 | $11,248,640.00 |
| 14.45% | 5.99% | $10,000,000.00 | $11,698,585.60 |
| 13.82% | 6.20% | $10,000,000.00 | $12,166,529.02 |
| 13.21% | 6.37% | $10,000,000.00 | $12,653,190.18 |
| 12.62% | 6.51% | $10,000,000.00 | $13,159,317.79 |
| 12.06% | 6.62% | $10,000,000.00 | $13,685,690.50 |
| 11.52% | 6.72% | $10,000,000.00 | $14,233,118.12 |
| 11.01% | 6.80% | $10,000,000.00 | $14,802,442.85 |

| (AE) | (AF) | (AG) | (AH) |
|---|---|---|---|
| NET SALE PROCEEDS BEFORE TAX NOMINAL DOLLARS, 6% COSTS | | NET SALES PROCEEDS AFTER TAX NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $4,914,211.19 | $7,093,944.83 | $3,527,120.94 | $5,286,830.76 |

Fig.3D

|  (P) | (Q) | (R) | (S) |
|---|---|---|---|
| LOAN BALANCE CONSTANT DOLLARS | | LOAN BALANCE NOMINAL DOLLARS | |
| REAL VALUE MORTGAGE | CONVENTIONAL MORTGAGE | REAL VALUE MORTGAGE | CONVENTIONAL MORTGAGE |
| $7,500,000.00 | $7,500,000.00 | $7,500,000.00 | $7,500,000.00 |
| $7,387,114.24 | $7,171,451.06 | $7,682,598.81 | $7,458,309.11 |
| $7,268,584.19 | $6,853,044.22 | $7,861,700.66 | $7,412,252.63 |
| $7,144,127.63 | $6,544,234.19 | $8,036,171.98 | $7,361,373.44 |
| $7,013,448.25 | $6,244,486.97 | $8,204,742.47 | $7,305,166.54 |
| $6,876,234.90 | $5,953,278.89 | $8,365,991.15 | $7,243,074.04 |
| $6,732,160.88 | $5,670,095.47 | $8,518,331.20 | $7,174,479.64 |
| $6,580,883.16 | $5,394,430.49 | $8,659,993.29 | $7,098,702.51 |
| $6,422,041.56 | $5,125,784.86 | $8,789,007.32 | $7,014,990.52 |
| $6,255,257.87 | $4,863,665.67 | $8,903,182.42 | $6,922,512.80 |
| $6,080,135.00 | $4,607,585.06 | $9,000,085.09 | $6,820,351.45 |

|  (AI) | (AJ) | (AK) | (AL) |
|---|---|---|---|
| TOTAL AFTER-TAX CASH FLOWS NOMINAL DOLLARS | | TOTAL AFTER-TAX CASH FLOWS CONSTANT DOLLARS | |
| REAL VALUE MORTGAGE | CONVENTIONAL MORTGAGE | REAL VALUE MORTGAGE | CONVENTIONAL MORTGAGE |
| ($2,500,000.00) | ($2,500,00.00) | ($2,500,000.00) | ($2,500,000.00) |
| $394,258.17 | $146,185.59 | $379,094.39 | $140,563.06 |
| $407,184.05 | $183,625.59 | $376,464.54 | $169,772.18 |
| $420,626.97 | $222,563.19 | $373,935.84 | $197,857.86 |
| $434,607.60 | $263,058.29 | $371,504.40 | $224,863.33 |
| $449,147.46 | $275,019.85 | $369,166.47 | $226,046.27 |
| $464,268.92 | $303,165.03 | $366,918.47 | $239,595.72 |
| $479,995.23 | $333,950.93 | $364,756.92 | $253,775.26 |
| $496,350.59 | $365,838.12 | $362,678.52 | $267,314.33 |
| $513,360.17 | $398,857.03 | $360,680.05 | $280,231.66 |
| $4,058,171.08 | $5,719,868.61 | $2,741,554.97 | $3,864,138.28 |
| $5,617,970.23 | $5,712,132.21 | $3,566,754.58 | $3,364,157.96 |

Fig.3E (AM)        (AN)

REAL (CONSTANT-DOLLAR)
AFTER TAX IRR

REAL VALUE   CONVENTIONAL
MORTGAGE     MORTGAGE        } *FIG. 3F*

14.60%       11.16%

(AM)        (AN)

REAL (CONSTANT-DOLLAR)
AFTER TAX IRR

REAL VALUE   CONVENTIONAL
MORTGAGE     MORTGAGE        } *FIG. 4F*

14.97%       9.43%

(AM)        (AN)

REAL (CONSTANT-DOLLAR)
AFTER TAX IRR

REAL VALUE   CONVENTIONAL
MORTGAGE     MORTGAGE        } *FIG. 5F*

13.75%       13.55%

| | PURCHASE PRICE: | $10,000,000.00 |
| --- | --- | --- |
| | LOAN AMOUNT: | $7,500,000.00 |
| | NOI AT PURCHASE: | $900,000.00 |
| | CAP RATE AT PURCHASE: | 9.00% |
| | MARKET CAP RATE: | 9.00% |

| | (A) | (B) | (C) |
| --- | --- | --- | --- |
| YEAR | NOI OF PROPERTY CONSTANT DOLLARS | INFLATION RATE | NOI OF PROPERTY NOMINAL DOLLARS |
| 0 | $900,000.00 | 4.00% | |
| 1 | $900,000.00 | 4.00% | $936,000.00 |
| 2 | $917,647.06 | 2.00% | $973,440.00 |
| 3 | $917,647.06 | 2.00% | $992,908.80 |
| 4 | $917,647.06 | 2.00% | $1,012,766.98 |
| 5 | $917,647.06 | 2.00% | $1,033,022.32 |
| 6 | $917,647.06 | 2.00% | $1,053,682.76 |
| 7 | $917,647.06 | 2.00% | $1,074,756.42 |
| 8 | $917,647.06 | 2.00% | $1,096,251.55 |
| 9 | $917,647.06 | 2.00% | $1,118,176.58 |
| 10 | $917,647.06 | 2.00% | $1,140,540.11 |
| TOTAL | | | $10,431,545.50 |

| | (T) | (U) | (V) |
| --- | --- | --- | --- |
| YEAR | DEPRECIATION TAX-SHIELD 31.5 YEAR ST. LINE 20% LAND VALUE NOMINAL DOLLARS | LOAN-TO-VALUE BASED ON MARKET VALUE REAL VALUE MORTGAGE | CONVENTIONAL MORTGAGE |
| 0 | | 75.00% | 75.00% |
| 1 | $253,968.25 | 73.87% | 71.71% |
| 2 | $253,968.25 | 72.69% | 68.53% |
| 3 | $253,968.25 | 71.44% | 66.73% |
| 4 | $253,968.25 | 70.13% | 64.92% |
| 5 | $253,968.25 | 68.76% | 63.10% |
| 6 | $253,968.25 | 67.32% | 61.28% |
| 7 | $253,968.25 | 65.81% | 59.44% |
| 8 | $253,968.25 | 64.22% | 57.59% |
| 9 | $253,968.25 | 62.55% | 55.72% |
| 10 | $253,968.25 | 60.80% | 53.82% |
| TOTAL | $2,539,682.54 | | |

*Fig.4A*

|  (D) | (E) | (F) | (G) |
|---|---|---|---|
| DEBT SERVICE NOMINAL DOLLARS | | PRE-TAX CASH-FLOW NOMINAL DOLLARS | |
| REAL VALUE MORTGAGE | CONVENTIONAL MORTGAGE | REAL VALUE MORTGAGE | CONVENTIONAL MORTGAGE |
| $487,184.64 | $789,814.41 | $448,815.36 | $146,185.59 |
| $506,672.03 | $789,814.41 | $466,767.97 | $183,625.59 |
| $521,491.15 | $789,814.41 | $471,417.65 | $203,094.39 |
| $531,920.97 | $789,814.41 | $480,846.00 | $222,952.56 |
| $542,559.39 | $789,814.41 | $490,462.92 | $243,207.90 |
| $553,410.58 | $789,814.41 | $500,272.18 | $263,868.35 |
| $564,478.79 | $789,814.41 | $510,277.62 | $284,942.00 |
| $575,768.37 | $789,814.41 | $520,483.18 | $306,437.13 |
| $587,283.74 | $789,814.41 | $530,892.84 | $328,362.16 |
| $599,029.41 | $789,814.41 | $541,510.70 | $350,725.69 |
| $5,469,799.08 | $7,898,144.13 | $4,961,746.42 | $2,533,401.37 |

| (W) | (X) | (Y) | (Z) |
|---|---|---|---|
| EQUITY IN PROPERTY CONSTANT DOLLARS | | EQUITY IN PROPERTY NOMINAL DOLLARS | |
| REAL VALUE MORTGAGE | CONVENTIONAL MORTGAGE | REAL VALUE MORTGAGE | CONVENTIONAL MORTGAGE |
| $2,500,000.00 | $2,500,000.00 | $2,500,000.00 | $2,500,000.00 |
| $2,612,885.76 | $2,828,548.94 | $2,717,401.19 | $2,941,690.89 |
| $2,784,972.99 | $3,208,660.79 | $2,954,299.34 | $3,403,747.37 |
| $2,911,869.87 | $3,392,691.57 | $3,150,689.78 | $3,670,946.56 |
| $3,045,111.59 | $3,577,019.21 | $3,360,756.65 | $3,947,799.86 |
| $3,185,015.40 | $3,761,962.26 | $3,585,465.62 | $4,234,951.69 |
| $3,331,914.40 | $3,947,859.92 | $3,825,850.83 | $4,533,106.61 |
| $3,486,158.34 | $4,135,073.93 | $4,083,019.74 | $4,843,035.46 |
| $3,648,114.49 | $4,323,990.54 | $4,358,158.30 | $5,165,582.20 |
| $3,818,168.44 | $4,515,022.64 | $4,652,536.59 | $5,501,671.38 |
| $3,996,725.10 | $4,708,612.09 | $4,967,514.72 | $5,852,316.42 |

Fig.4B

| (H) | (I) | (J) | (K) |
|---|---|---|---|
| DEBT-COVERAGE-RATIO | | CASH-ON-CASH RETURN BASED ON INITIAL EQUITY INVESTMENT | |
| REAL VALUE MORTGAGE | CONVENTIONAL MORTGAGE | REAL VALUE MORTGAGE | CONVENTIONAL MORTGAGE |
| 1.92 | 1.19 | 17.95% | 5.85% |
| 1.92 | 1.23 | 18.67% | 7.35% |
| 1.90 | 1.26 | 18.86% | 8.12% |
| 1.90 | 1.28 | 19.23% | 8.92% |
| 1.90 | 1.31 | 19.62% | 9.73% |
| 1.90 | 1.33 | 20.01% | 10.55% |
| 1.90 | 1.36 | 20.41% | 11.40% |
| 1.90 | 1.39 | 20.82% | 12.26% |
| 1.90 | 1.42 | 21.24% | 13.13% |
| 1.90 | 1.44 | 21.66% | 14.03% |

| (AA) | (AB) | (AC) | (AD) |
|---|---|---|---|
| TAX-LOSS CARRY-FORWARD NOMINAL DOLLARS | | AFTER-TAX OPERATING CASH FLOW NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | ($66,091.77) | $394,258.17 | $146,185.59 |
| $0.00 | ($90,377.97) | $407,184.05 | $183,625.59 |
| $0.00 | ($90,372.64) | $410,531.82 | $203,094.39 |
| $0.00 | ($65,181.43) | $417,320.23 | $222,952.56 |
| $0.00 | ($13,849.28) | $424,244.41 | $243,207.90 |
| $0.00 | $0.00 | $431,307.08 | $245,767.69 |
| $0.00 | $0.00 | $438,511.00 | $255,051.76 |
| $0.00 | $0.00 | $445,859.00 | $268,306.49 |
| $0.00 | $0.00 | $453,353.96 | $281,638.11 |
| $0.00 | $0.00 | $460,998.81 | $295,028.43 |
| | | $4,283,568.53 | $2,344,858.50 |

Fig.4C

| (L) | (M) | (N) | (O) |
|---|---|---|---|
| CURRENT RETURN ON EQUITY IN THE PROPERTY | | MARKET VALUE OF THE PROPERTY CONSTANT DOLLARS | MARKET VALUE OF THE PROPERTY NOMINAL DOLLARS |
| REAL VALUE MORTGAGE | CONVENTIONAL MORTGAGE | | |
| 16.52% | 4.97% | $10,000,000.00 | $10,400,000.00 |
| 15.80% | 5.39% | $10,196,078.43 | $10,816,000.00 |
| 14.96% | 5.53% | $10,196,078.43 | $11,032,320.00 |
| 14.31% | 5.65% | $10,196,078.43 | $11,252,966.40 |
| 13.68% | 5.74% | $10,196,078.43 | $11,478,025.73 |
| 13.08% | 5.82% | $10,196,078.43 | $11,707,586.24 |
| 12.50% | 5.88% | $10,196,078.43 | $11,941,737.97 |
| 11.94% | 5.93% | $10,196,078.43 | $12,180,572.73 |
| 11.41% | 5.97% | $10,196,078.43 | $12,424,184.18 |
| 10.90% | 5.99% | $10,196,078.43 | $12,672,667.86 |

| (AE) | (AF) | (AG) | (AH) |
|---|---|---|---|
| NET SALE PROCEEDS BEFORE TAX NOMINAL DOLLARS, 6% COSTS | | NET SALES PROCEEDS AFTER TAX NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $4,207,154.65 | $5,091,956.34 | $3,018,040.23 | $3,845,399.05 |

Fig.4D

| (P) | (Q) | (R) | (S) |
|---|---|---|---|
| LOAN BALANCE CONSTANT DOLLARS | | LOAN BALANCE NOMINAL DOLLARS | |
| REAL VALUE MORTGAGE | CONVENTIONAL MORTGAGE | REAL VALUE MORTGAGE | CONVENTIONAL MORTGAGE |
| $7,500,000.00 | $7,500,000.00 | $7,500,000.00 | $7,500,000.00 |
| $7,387,114.24 | $7,171,451.06 | $7,682,598.81 | $7,458,309.11 |
| $7,411,105.44 | $6,987,417.64 | $7,861,700.66 | $7,412,252.63 |
| $7,284,208.57 | $6,803,386.87 | $7,881,630.22 | $7,361,373.44 |
| $7,150,966.84 | $6,619,059.22 | $7,892,209.75 | $7,305,166.54 |
| $7,011,063.04 | $6,434,116.17 | $7,892,560.11 | $7,243,074.04 |
| $6,864,164.04 | $6,248,218.51 | $7,881,735.41 | $7,174,479.64 |
| $6,709,920.09 | $6,061,004.50 | $7,858,718.23 | $7,098,702.51 |
| $6,547,963.94 | $5,872,087.89 | $7,822,414.42 | $7,014,990.52 |
| $6,377,909.99 | $5,681,055.79 | $7,771,647.59 | $6,922,512.80 |
| $6,199,353.34 | $5,487,466.34 | $7,705,153.15 | $6,820,351.45 |

| (AI) | (AJ) | (AK) | (AL) |
|---|---|---|---|
| TOTAL AFTER-TAX CASH FLOWS NOMINAL DOLLARS | | TOTAL AFTER-TAX CASH FLOWS CONSTANT DOLLARS | |
| REAL VALUE MORTGAGE | CONVENTIONAL MORTGAGE | REAL VALUE MORTGAGE | CONVENTIONAL MORTGAGE |
| ($2,500,000.00) | ($2,500,00.00) | ($2,500,000.00) | ($2,500,000.00) |
| $394,258.17 | $146,185.59 | $379,094.39 | $140,563.06 |
| $407,184.05 | $183,625.59 | $383,846.20 | $173,101.04 |
| $410,531.82 | $203,094.39 | $379,413.81 | $187,699.98 |
| $417,320.23 | $222,952.56 | $378,125.17 | $202,012.67 |
| $424,244.41 | $243,207.90 | $376,861.79 | $216,044.72 |
| $431,307.08 | $245,767.69 | $375,623.18 | $214,037.85 |
| $438,511.00 | $255,051.76 | $374,408.86 | $217,767.94 |
| $445,859.00 | $268,306.49 | $373,218.35 | $224,593.22 |
| $453,353.96 | $281,638.11 | $372,051.19 | $231,130.20 |
| $3,479,039.05 | $4,140,427.48 | $2,799,138.70 | $3,331,273.56 |
| $4,801,608.77 | $3,690,257.55 | $3,691,781.66 | $2,638,224.26 |

Fig.4E

| | PURCHASE PRICE: | $10,000,000.00 |
| --- | --- | --- |
| | LOAN AMOUNT: | $7,500,000.00 |
| | NOI AT PURCHASE: | $900,000.00 |
| | CAP RATE AT PURCHASE: | 9.00% |
| | MARKET CAP RATE: | 9.00% |

| | (A) | (B) | (C) |
| --- | --- | --- | --- |
| YEAR | NOI OF PROPERTY CONSTANT DOLLARS | INFLATION RATE | NOI OF PROPERTY NOMINAL DOLLARS |
| 0 | $900,000.00 | 4.00% | |
| 1 | $900,000.00 | 4.00% | $936,000.00 |
| 2 | $883,018.87 | 6.00% | $973,440.00 |
| 3 | $866,666.67 | 8.00% | $1,031,846.40 |
| 4 | $850,909.09 | 10.00% | $1,114,394.11 |
| 5 | $850,909.09 | 10.00% | $1,225,833.52 |
| 6 | $850,909.09 | 10.00% | $1,348,416.88 |
| 7 | $850,909.09 | 10.00% | $1,483,258.56 |
| 8 | $850,909.09 | 10.00% | $1,631,584.42 |
| 9 | $850,909.09 | 10.00% | $1,794,742.86 |
| 10 | $850,909.09 | 10.00% | $1,974,217.15 |
| TOTAL | | | $13,513,733.90 |

| | (T) | (U) | (V) |
| --- | --- | --- | --- |
| YEAR | DEPRECIATION TAX-SHIELD 31.5 YEAR ST. LINE 20% LAND VALUE NOMINAL DOLLARS | LOAN-TO-VALUE BASED ON MARKET VALUE REAL VALUE MORTGAGE | CONVENTIONAL MORTGAGE |
| 0 | | 75.00% | 75.00% |
| 1 | $253,968.25 | 73.87% | 71.71% |
| 2 | $253,968.25 | 72.69% | 68.53% |
| 3 | $253,968.25 | 71.44% | 64.21% |
| 4 | $253,968.25 | 70.13% | 59.00% |
| 5 | $253,968.25 | 68.76% | 53.18% |
| 6 | $253,968.25 | 67.32% | 47.89% |
| 7 | $253,968.25 | 65.81% | 43.07% |
| 8 | $253,968.25 | 64.22% | 38.70% |
| 9 | $253,968.25 | 62.55% | 34.71% |
| 10 | $253,968.25 | 60.80% | 31.09% |
| TOTAL | $2,539,682.54 | | |

Fig.5A

| (D) | (E) | (F) | (G) |
|---|---|---|---|
| DEBT SERVICE NOMINAL DOLLARS | | PRE-TAX CASH-FLOW NOMINAL DOLLARS | |
| REAL VALUE MORTGAGE | CONVENTIONAL MORTGAGE | REAL VALUE MORTGAGE | CONVENTIONAL MORTGAGE |
| $487,184.64 | $789,814.41 | $448,815.36 | $146,185.59 |
| $506,672.03 | $789,814.41 | $466,767.97 | $183,625.59 |
| $532,322.06 | $789,814.41 | $499,524.34 | $242,031.99 |
| $569,900.89 | $789,814.41 | $544,493.22 | $324,579.70 |
| $621,513.61 | $789,814.41 | $604,319.92 | $436,019.11 |
| $683,664.97 | $789,814.41 | $664,751.91 | $558,602.46 |
| $752,031.46 | $789,814.41 | $731,227.10 | $693,444.15 |
| $827,234.61 | $789,814.41 | $804,349.81 | $841,770.01 |
| $909,958.07 | $789,814.41 | $884,784.79 | $1,004,928.45 |
| $1,000,953.88 | $789,814.41 | $973,263.27 | $1,184,402.73 |
| $6,891,436.22 | $7,898,144.13 | $6,622,297.69 | $5,615,589.77 |

| (W) | (X) | (Y) | (Z) |
|---|---|---|---|
| EQUITY IN PROPERTY CONSTANT DOLLARS | | EQUITY IN PROPERTY NOMINAL DOLLARS | |
| REAL VALUE MORTGAGE | CONVENTIONAL MORTGAGE | REAL VALUE MORTGAGE | CONVENTIONAL MORTGAGE |
| $2,500,000.00 | $2,500,000.00 | $2,500,000.00 | $2,500,000.00 |
| $2,612,885.76 | $2,828,548.94 | $2,717,401.19 | $2,941,690.89 |
| $2,679,879.67 | $3,087,579.25 | $2,954,299.34 | $3,403,747.37 |
| $2,750,099.32 | $3,446,677.42 | $3,274,246.25 | $4,103,586.56 |
| $2,823,648.93 | $3,876,597.27 | $3,697,995.21 | $5,076,990.26 |
| $2,953,377.91 | $4,426,784.81 | $4,254,684.42 | $6,377,298.44 |
| $3,089,593.35 | $4,927,139.98 | $4,896,010.46 | $7,807,930.09 |
| $3,232,619.56 | $5,382,193.78 | $5,634,927.03 | $9,381,948.19 |
| $3,382,797.07 | $5,796,065.31 | $6,486,379.16 | $11,113,725.25 |
| $3,540,483.47 | $6,172,499.21 | $7,467,610.22 | $13,019,074.55 |
| $3,706,054.18 | $6,514,899.70 | $8,598,516.33 | $15,115,394.63 |

*Fig.5B*

| (H) | (I) | (J) | (K) |
|---|---|---|---|
| DEBT-COVERAGE-RATIO | | CASH-ON-CASH RETURN BASED ON INITIAL EQUITY INVESTMENT | |
| REAL VALUE MORTGAGE | CONVENTIONAL MORTGAGE | REAL VALUE MORTGAGE | CONVENTIONAL MORTGAGE |
| 1.92 | 1.19 | 17.95% | 5.85% |
| 1.92 | 1.23 | 18.67% | 7.35% |
| 1.94 | 1.31 | 19.98% | 9.68% |
| 1.96 | 1.41 | 21.78% | 12.98% |
| 1.97 | 1.55 | 24.17% | 17.44% |
| 1.97 | 1.71 | 26.59% | 22.34% |
| 1.97 | 1.88 | 29.25% | 27.74% |
| 1.97 | 2.07 | 32.17% | 33.67% |
| 1.97 | 2.27 | 35.39% | 40.20% |
| 1.97 | 2.50 | 38.93% | 47.38% |

| (AA) | (AB) | (AC) | (AD) |
|---|---|---|---|
| TAX-LOSS CARRY-FORWARD NOMINAL DOLLARS | | AFTER-TAX OPERATING CASH FLOW NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | ($66,091.77) | $394,258.17 | $146,185.59 |
| $0.00 | ($90,377.97) | $407,184.05 | $183,625.59 |
| $0.00 | ($51,435.04) | $430,768.64 | $242,031.99 |
| $0.00 | $0.00 | $463,146.23 | $303,472.37 |
| $0.00 | $0.00 | $506,221.45 | $367,658.97 |
| $0.00 | $0.00 | $549,732.48 | $454,098.45 |
| $0.00 | $0.00 | $597,594.62 | $549,173.30 |
| $0.00 | $0.00 | $650,242.97 | $653,746.16 |
| $0.00 | $0.00 | $708,156.16 | $768,765.83 |
| $0.00 | $0.00 | $771,860.66 | $895,275.90 |
| | | $5,479,165.44 | $4,564,034.15 |

Fig. 5C

| (L) | (M) | (N) | (O) |
|---|---|---|---|
| CURRENT RETURN ON EQUITY IN THE PROPERTY | | MARKET VALUE OF THE PROPERTY CONSTANT DOLLARS | MARKET VALUE OF THE PROPERTY NOMINAL DOLLARS |
| REAL VALUE MORTGAGE | CONVENTIONAL MORTGAGE | | |
| 16.52% | 4.97% | $10,000,000.00 | $10,400,000.00 |
| 15.80% | 5.39% | $9,811,320.75 | $10,816,000.00 |
| 15.26% | 5.90% | $9,629,629.63 | $11,464,960.00 |
| 14.72% | 6.39% | $9,454,545.45 | $12,382,156.80 |
| 14.20% | 6.84% | $9,454,545.45 | $13,620,372.48 |
| 13.58% | 7.15% | $9,454,545.45 | $14,982,409.73 |
| 12.98% | 7.39% | $9,454,545.45 | $16,480,650.70 |
| 12.40% | 7.57% | $9,454,545.45 | $18,128,715.77 |
| 11.85% | 7.72% | $9,454,545.45 | $19,941,587.35 |
| 11.32% | 7.84% | $9,454,545.45 | $21,935,746.08 |

| (AE) | (AF) | (AG) | (AH) |
|---|---|---|---|
| NET SALE PROCEEDS BEFORE TAX NOMINAL DOLLARS, 6% COSTS | | NET SALES PROCEEDS AFTER TAX NOMINAL DOLLARS, 28% TAX RATE | |
| REAL VALUE MORTGAGE | CONVENTIONAL MORTGAGE | REAL VALUE MORTGAGE | CONVENTIONAL MORTGAGE |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $0.00 | $0.00 | $0.00 | $0.00 |
| $7,282,371.56 | $13,799,249.87 | $5,232,196.41 | $10,114,650.39 |

*Fig.5D*

| (P) | (Q) | (R) | (S) |
|---|---|---|---|
| LOAN BALANCE CONSTANT DOLLARS | | LOAN BALANCE NOMINAL DOLLARS | |
| REAL VALUE MORTGAGE | CONVENTIONAL MORTGAGE | REAL VALUE MORTGAGE | CONVENTIONAL MORTGAGE |
| $7,500,000.00 | $7,500,000.00 | $7,500,000.00 | $7,500,000.00 |
| $7,387,114.24 | $7,171,451.06 | $7,682,598.81 | $7,458,309.11 |
| $7,131,441.09 | $6,723,741.50 | $7,861,700.66 | $7,412,252.63 |
| $6,879,530.31 | $6,182,952.21 | $8,190,713.75 | $7,361,373.44 |
| $6,630,896.53 | $5,577,948.19 | $8,684,161.59 | $7,305,166.54 |
| $6,501,167.54 | $5,027,760.64 | $9,365,688.06 | $7,243,074.04 |
| $6,364,952.11 | $4,527,405.47 | $10,086,399.27 | $7,174,479.64 |
| $6,221,925.90 | $4,072,351.68 | $10,845,723.67 | $7,098,702.51 |
| $6,071,748.38 | $3,658,480.15 | $11,642,336.61 | $7,014,990.52 |
| $5,914,061.99 | $3,282,046.25 | $12,473,977.12 | $6,922,512.80 |
| $5,748,491.28 | $2,939,645.75 | $13,337,229.76 | $6,820,351.45 |

| (AI) | (AJ) | (AK) | (AL) |
|---|---|---|---|
| TOTAL AFTER-TAX CASH FLOWS NOMINAL DOLLARS | | TOTAL AFTER-TAX CASH FLOWS CONSTANT DOLLARS | |
| REAL VALUE MORTGAGE | CONVENTIONAL MORTGAGE | REAL VALUE MORTGAGE | CONVENTIONAL MORTGAGE |
| ($2,500,000.00) | ($2,500,00.00) | ($2,500,000.00) | ($2,500,000.00) |
| $394,258.17 | $146,185.59 | $379,094.39 | $140,563.06 |
| $407,184.057 | $183,625.59 | $369,361.44 | $166,568.93 |
| $430,768.64 | $242,031.99 | $361,810.46 | $203,287.09 |
| $463,146.23 | $303,472.37 | $353,640.90 | $231,720.00 |
| $506,221.45 | $367,658.97 | $351,392.28 | $255,209.50 |
| $549,732.48 | $454,098.45 | $346,904.86 | $286,555.67 |
| $597,594.62 | $549,173.30 | $342,825.39 | $315,047.27 |
| $650,242.97 | $653,746.16 | $339,116.78 | $340,943.77 |
| $708,156.16 | $768,765.83 | $335,745.32 | $364,481.09 |
| $6,004,057.08 | $11,009,926.29 | $2,587,813.99 | $4,745,398.14 |
| $8,211,361.86 | $12,178,684.54 | $3,267,705.81 | $4,549,774.52 |

*Fig.5E*

SYSTEM AND PROCESS FOR CONVERTING CONSTANT DOLLAR FINANCIAL INSTRUMENTS

A portion of the disclosure of this patent document contains material which is subject to copyright protection. The owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention is directed to a system and process for specifying a constant-dollar financial instrument and then, step-by-step, primary component-by-primary component, transforming the desired constant-dollar financial instrument into an equivalent nominal-dollar instrument.

In the prior art, there is disclosed processes for specifying a nominal-dollar financial instrument and then adjusting the nominal-dollar financial instrument (in varying degrees) for the impact of inflation. However, such prior art type processes do not achieve the advantages of the present invention. The constant-dollar financial instrument of the present invention make use of the "matching principle" as will be discussed below.

Constant dollar financial instruments are financial instruments whose primary components are defined in terms of constant-dollars. Constant dollars are nominal-dollars, (the dollars of ordinary commerce), adjusted by the use of a price index, thereby eliminating the impact of inflation on the purchasing power of the dollar (i.e., constant-dollars are dollars with constant purchasing power as opposed to constant face value). Nominal dollars are dollars having a constant face value. For example, a one dollar bill is a nominal-dollar. However, two years from now that one dollar, given the effects of inflation, will have a purchasing power of less than one dollar.

The inventors of the present invention have established that the application of the "matching principle" requires the general utilization of constant-dollar financial instruments by providers and users of funds throughout the financial system.

The "matching principle" is a fundamental principle in the area of applied finance that has been the subject of very little academic research. It applies to both users and providers of funds.

For users of funds, the application of the "matching principle" requires that the characteristics of the financial instruments issued by the user of funds should be matched as closely as possible to the characteristics of the investments being financed by the user of funds. For providers of funds, the application of the "matching principle" requires that the characteristics of the financial instrument in which a provider of funds invests should be matched as closely as possible to the characteristics of the liabilities being funded by the provider of funds.

Final users of funds invest in the real productive capital (e.g., plant and equipment, commercial real estate, social infrastructure, etc.) of the economy. These "Real" assets have expected income streams and expected depreciation schedules that are most accurately described in terms of constant dollars as opposed to nominal dollars. This is because their future income streams and depreciation schedules as measured in nominal dollars will vary with unknown future inflation rates, but this variation is eliminated by utilizing constant dollars which are unaffected by future inflation.

The application of the "matching principle" to final users of funds requires that the payment schedule of the instrument match the time pattern of the income stream of the LDB WFP asset being financed and that the amoritization schedule of the instrument match the depreciation schedule of the asset being financed. Since both the income stream and the depreciation schedules of the assets being financed are most accurately defined in terms of constant dollars, both the payment and amortization schedules of the financial instrument must also be defined in terms of constant dollars. Mathematical consistency then requires that the rate of return must also be defined in terms of constant dollars. Therefore, application of the matching principle requires that final users of funds utilize constant-dollar financial instruments to finance their investments in real assets.

Final providers of funds are the actual savers in the economy or their agents. The actual savers in the economy are those who choose to forgo consumption in order to save—i.e., the individual consumers in the economy. The agents of the actual savers are those institutions to whom individual consumers have delegated some part of their saving activity. Pension funds are also the largest and fastest growing agents of actual savers. Pension funds are also the largest and fastest growing source of long-term funds in the economy.

The application of the "matching principle" to final providers of funds requires that the characteristics of the financial instruments in which providers of funds invest should be matched as closely as possible to the characteristics of the liabilities which the providers are funding.

The liabilities that the final providers of funds or their agents are funding include retirement, future educational expenses, and possible future medical expenses. All of these liabilities are "Real" liabilities—i.e., they are much more accurately defined in terms of constant dollars than in terms of nominal dollars because constant dollars are not affected by unknown future inflation. Therefore, application of the "matching principle" to the final providers of funds requires that they fund their "Real" liabilities with constant-dollar financial instruments.

Financial intermediaries stand between the final users of funds and the final providers of funds. Financial intermediaries provide most of the funds utilized by final users of funds and use most of the funds provided by final providers of funds. The final users of funds, the final providers of funds, and financial intermediaries, taken together, make up the general financial system of the economy.

The "matching principle" also applies to financial intermediaries. They must match the characteristics of their assets (the securities issued by final users of funds) to the characteristics of their liabilities (the securities that financial intermediaries issue to final providers of funds). The application of the "matching principle" to the financial system of the economy requires that all of the participants—the final users of funds, the final providers of funds, and the financial intermediaries—all utilize constant-dollar financial instruments.

However, constant-dollar financial instruments are not consistent with present legal and tax statutes. If constant-dollar financial instruments are to be utilized to achieve the benefits that they make possible through effective utilization of the matching principle, then a process is required to transform any desired constant-dollar financial instrument into an equivalent nominal-dollar instrument.

SUMMARY OF THE INVENTION

The present invention involves the application of the "matching principle" to a process for converting a specific constant-dollar financial instrument (whose primary components have been specified in a manner consistent with an optimal match), into an equivalent financial instrument defined in terms of the nominal-dollars of ordinary commerce, and therefore consistent with existing legal and tax statutes. The "matching principle" involves matching the characteristics of financing instruments to the financial needs of the users of funds and/or matching the characteristics of the financial instruments to the investment needs of the providers of funds. Because of the impact of uncertain and unknowable future inflation, nominal-dollar financial instruments do not allow an effective utilization of the matching principle for either final users or final providers of funds. Effective application of the matching principle requires the general utilization of constant-dollar financial instruments throughout the financial system—by financial intermediaries as well as by final users and providers of funds. The benefits of the effective application of the matching principle that can be realized only by the utilization of constant-dollar financial instruments are measured by the shift in the market risk/return tradeoff faced by the final users and providers of funds. The utilization of constant-dollar financial instruments allows both final users and final providers of funds to achieve both higher expected returns and lower risks.

According to the present invention, this process begins with constant-dollar financial instruments that effectively implement the matching principle and the conversion factors to be used to convert the desired constant-dollar financial instrument into an equivalent nominal-dollar financial instrument. The conversion factors to be specified include:

1. The measure of inflation (e.g., price index) to be utilized for the conversion of constant-dollars into nominal-dollars.
2. The base period for conversion.
3. The frequency with which nominal-dollar values would be adjusted for inflation.

The present invention converts the primary components of the desired constant-dollar financial instrument into standard form. Conversion of the constant-dollar financial instrument into standard form is the process of converting each of the primary components into a standard form, where the standard form of each component is a matter of the particular conventions built into the particular processing system.

For example, interest rate or rate of return must be defined in terms of a particular convention. Generally, (as assumed in the equations), the convention will be to express rates of return as effective annual rates of return with annual compounding—which is the specified rate of return measure under federal truth-in-lending statutes.

Payment schedules and amortization schedules will be converted into arrays, where the elements in the arrays are either constant-dollar amounts or functions of constant-dollar amounts. For payment schedules, the number of elements in the array will equal the number of payment periods or the number of adjustment periods, whichever is greater (if the number of adjustment periods exceeds the number of payment periods, then some elements in the payment array will be zero to reflect adjustment periods when there is no scheduled payment). The number of elements in amortization arrays will equal the number of payment periods or the number of adjustment periods, whichever is greater, plus one. The first element in the amortization array will be the initial loan balance.

The terms and covenants will be converted into a standard array of terms and convenants. This array will be defined in such a way as to include all normal terms and covenants for a broad variety of instruments.

The system further defines a measure of the inflation rate consistent with the standard form for specifying the rate of return, (for example, the effective annual rate), utilizing this specified inflation measure. The system generates the specification of each of the primary components of the equivalent nominal-dollar financial instrument in terms of nominal-dollars and the specified measure of inflation. The system outputs the specifications of each of the primary components of the equivalent nominal-dollar financial instrument in a format consistent with the preparation of legal documents. When the loan is closed and funded, (or the securities are issued and funds are released from escrow), the actual transaction data and inflation data are entered into the system and updated regularly. The system performs all loan servicing function, generating current data for all primary components of the financial instrument in nominal-dollars and updating these figures with every inflation adjustment period and every payment period, and with every payment received (including accrued interest, late payment penalty, etc.).

BRIEF DESCRIPTION OF THE DRAWINGS

FIGS. 2a-2c is a flow chart illustrating the principles of the present invention concerning servicing financial instruments.

FIGS. 3a-5f are spreadsheets which show the advantages of the present invention under different inflation scenarios.

DETAILED DESCRIPTION OF THE INVENTION

Figure 1A:
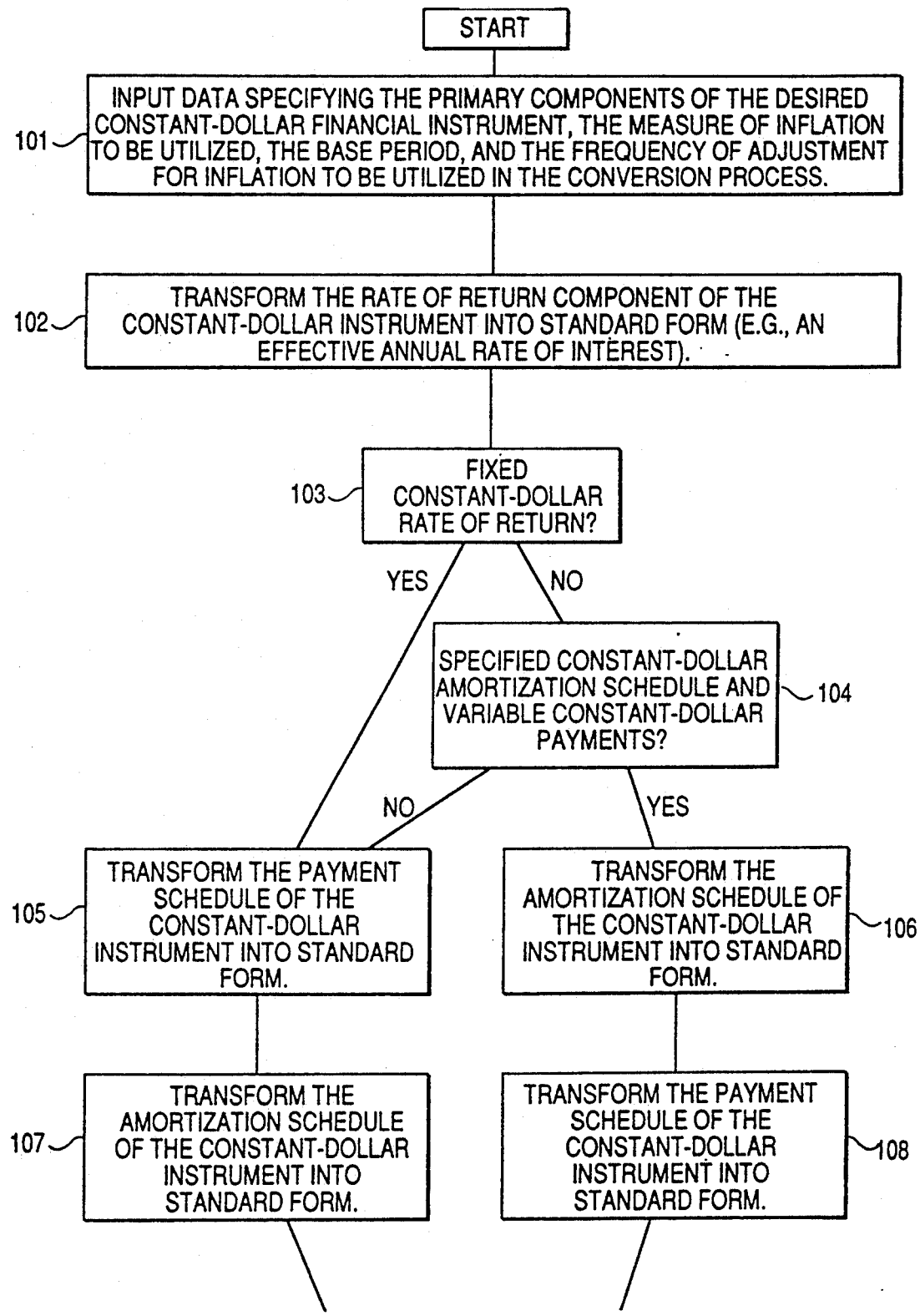
FIGS. 1a-1c is a flow chart illustrating the principles of the present invention concerning conversion of instruments.

The data processing system for carrying out the present invention generally comprises three components—an input device, a processing device and an output device. The input device comprises a mechanism for entering the primary components (specified below) of the desired constant-dollar financial instrument, the specified measure of inflation, the base period, and the frequency of adjustment for inflation to be utilized in the conversion process. The input device may also include a mechanism for entering the actual payment records, inflation data and other data required to service the equivalent nominal-dollar financial instruments generated by the system.

The processing device transforms the primary components of the constant-dollar financial instrument into standard form; defines a measure of the inflation rate; uses the specified inflation measure, consistent with the standard measure for the rate of return (e.g., the effective annual rate of interest) and generates the equivalent nominal-dollar specification of each of the primary components of the desired constant-dollar financial instrument in terms of nominal-dollars and inflation rates given the frequency of adjustment for inflation and the base period. The processing unit also calculates the current nominal-dollar return, the current interest (and penalties, if any) due, the amount of the payment being utilized for payment of current interest (and penalties, if any), the change in accrued interest from the prior payment period, if applicable, and the new level of accrued interest, if any, the change in the outstanding loan balance from the prior payment period, and the new loan balance, the nominal-dollar return for the subsequent payment period, the required payment for the subsequent payment period. The processing unit also checks all loan terms and covenants against the latest inputted data for compliance of the loan with all terms and covenants.

The output device prints out the specifications of each of the three components of the equivalent nominal-dollar financial instrument in a format consistent with preparation of promissory notes and other legal documents.

The output device also prints out the current nominal-dollar return, the current interest (and penalties, if any) due, the payment amount and the amount of the payment being utilized for payment of current interest (and penalties, if any), the change in the amount of accrued interest from the prior payment period, is applicable, and the new level of accrued interest, if any, the change in the outstanding loan balance from the prior payment period, and the current loan balance, a list of the loan terms and/or covenants, if any, with which the loan is not currently in compliance, and the supporting data therefor, all current financial data required to be supplied by the borrower, the nominal-dollar return for the subsequent payment payment period and the required payment for the subsequent payment period.

Selection and definition of the desired constant-dollar financial instrument

Possible types of constant-dollar financial instruments include, but are not limited to bonds of all types, including mortgage bonds, debentures, subordinated debentures, and capital notes; mortages and deeds of trust of all types, loans of all types, leases of all types, promissory notes of all types, life insurance policies and annuities, investment company shares and deposits and certificates of deposit.

Selection of the proper type of constant-dollar financial instrument depends on the function of the instrument, the business activities of the issuer of the instrument, and the type of assets to be financed by the instruments.

Definition of the desired constant-dollar financial instrument is a matter of specifying the primary components of the desired constant-dollar financial instrument.

The primary components of constant-dollar financial instruments may comprise: the rate of return or rate of interest, the payment schedule, the amortization schedule, the loan terms and covenants. The rate of return is a "Real," or purchasing power rate of return because it is defined in terms of constant-dollars. The constant-dollar rate of return may be either fixed or variable. If the constant-dollar rate of return is variable, it will be a function of some set of constant-dollar variables—e.g., some fixed constant-dollar rate of return plus some share of constant-dollar revenues. The payment schedule is defined in terms of constant-dollars. If the constant-dollar rate of return is fixed, then there will be a fixed relationship between a fixed constant-dollar payment schedule and a fixed constant-dollar amortization schedule based on the fixed constant-dollar rate of return. If the constant-dollar rate of return is variable and the constant-dollar amortization schedule is fixed, then the constant-dollar payment schedule will be variable because it is a function of the fixed constant-dollar amortization schedule and the variable constant-dollar rate of return. The amortization schedule is defined in terms of constant-dollars. If the constant-dollar rate of return is variable and the constant-dollar payment amounts are fixed, then the constant-dollar amortization schedule (and the maturity of the instrument) will be variable because it is a function of the fixed constant-dollar payments and the variable constant-dollar rate of return. All loan terms and covenants involving dollar amounts (e.g., minimum amount of net working capital to be maintained by the borrower) are defined in terms of constant-dollars.

Gains to both providers and users of funds are maximized by utilizing the "matching principle" (see Background of the Invention) to define the constant-dollar payment and amortization schedules. As demonstrated in the Background of Invention section, application of the "matching principle" requires that the payment and amortization schedules be defined in terms of constant-dollars. If the payment and amortization schedules are defined in terms of constant-dollars, then mathematical consistency requires that the rate of return or rate of interest also be defined in terms of constant-dollars. As a general rule, low and moderate risk constant-dollar financial instruments will have fixed constant-dollar returns or rates of interest-variable constant-dollar returns or rates of interest will generally be utilized only for higher risk instruments.

Conversion of the desired constant-dollar financial instruments into equivalent nominal-dollar financial instruments The desired constant-dollar financial instruments must be converted into equivalent nominal-dollar financial instruments to achieve consistency with existing legal and tax statutes.

Figure 1B:
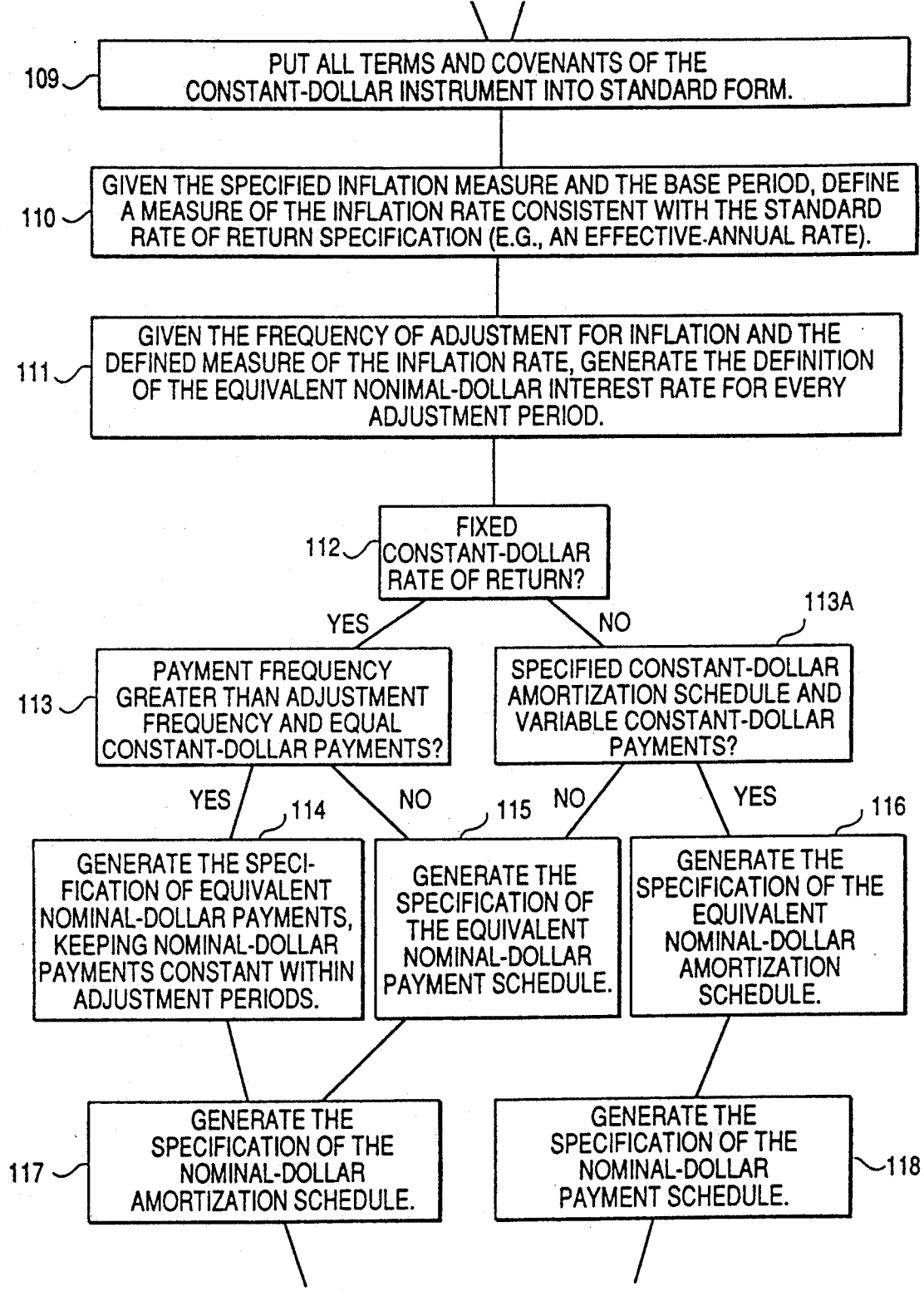
Figure 1C:
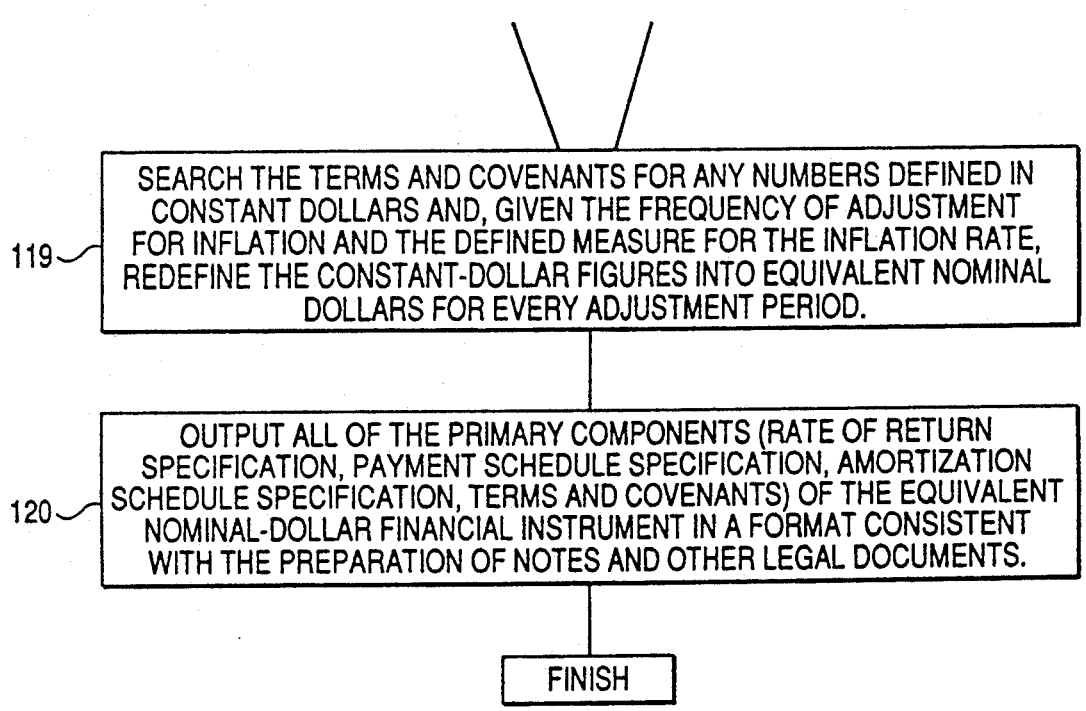
Figure 2A:
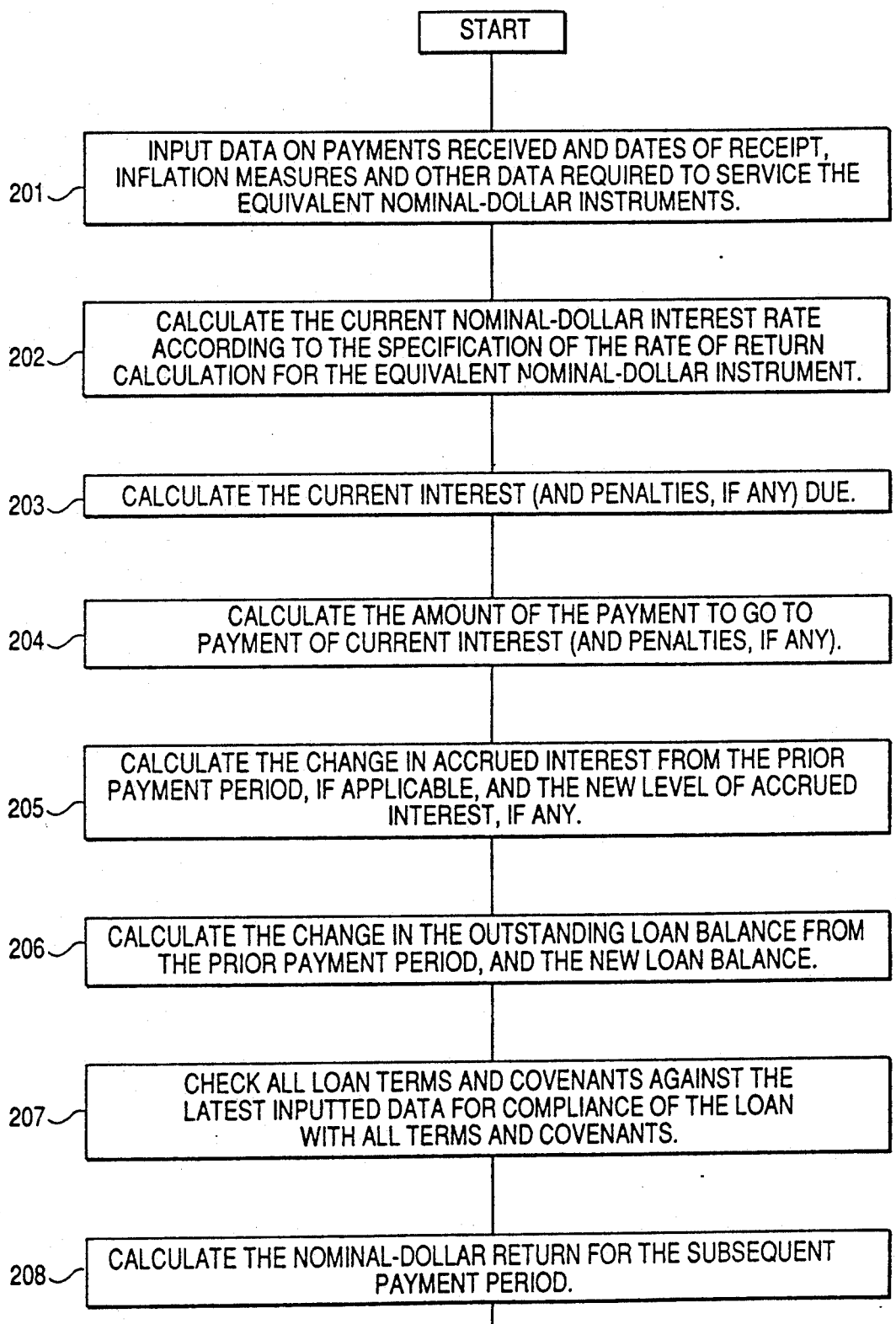
Figure 2B:
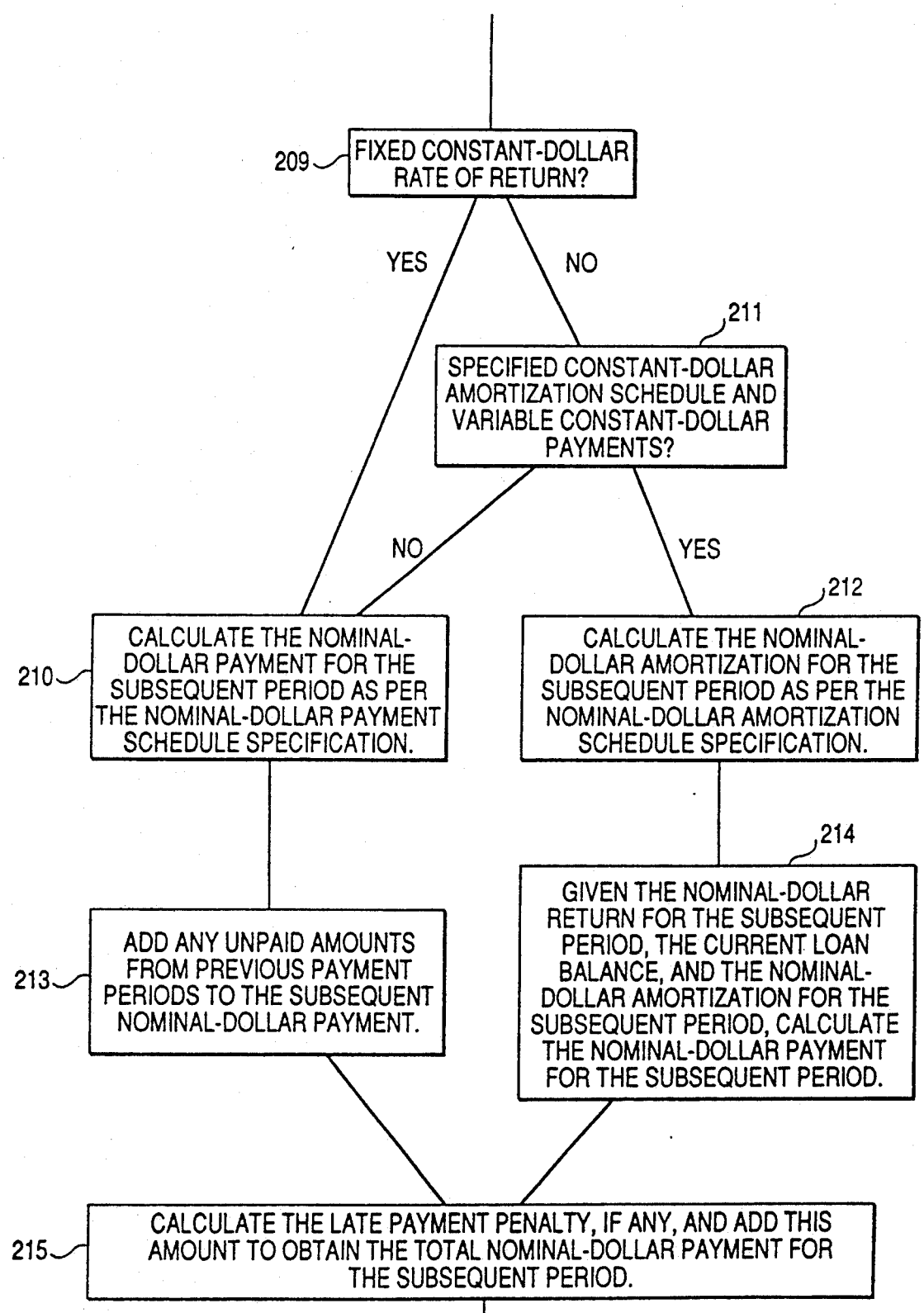

The first step in the conversion process (see FIG. 1) is to enter into the data processing system the definition of the desired constant-dollar financial instrument (i.e., the specifications of the primary components of the desired constant-dollar financial instrument), the specified measure of inflation, the base period, and frequency of adjustment for inflation to be utilized (step 101).

If the constant-dollar rate of return is variable, then either the constant-dollar amortization schedule will be fixed and the constant-dollar payment schedule will be a function of the fixed amortization schedule and the variable constant-dollar rate of return, or the constant-dollar payments will be fixed and the constant-dollar amortization schedule will be a function of the fixed constant-dollar payments and the variable constant-dollar rate of return.

The processing unit first transforms the primary components of the desired constant-dollar financial instrument into standard form (step 102). The constant-dollar rate of return or interest rate specification is put into a standard form such as an effective annual rate of return. If the rate of return is not specified as a true interest rate (e.g., if it is specified as a discount rate of interest), it is converted to a true interest rate specification. If the rate of return is not specified on an annual basis (e.g., a monthly rate of return), it is converted to an annual basis. The final step is to convert to a standard compounding period such as annual compounding for effective annual rates of return, semi-annual for bond-equivalent yields, etc.

The payment and amortization schedules are transformed into standard arrays—which is transformed first depends on whether the constant-dollar rate of return is fixed, and if not, whether or not the amortization schedule is fixed. To do this, the processing unit determines whether there is a fixed constant-dollar rate of return (step 103). If it is fixed, the payment schedule is transformed into standard form (step 105). If the constant-dollar rate of return is not fixed, it is determined whether there are variable constant-dollar payments (step 104). If not, the payment schedule is transformed into standard form (step 105). If there are variable constant-dollar payments, the amortization schedule is transformed into standard form (step 106). If the payment schedule was transformed into standard form in step 105, then the amortization schedule is transformed into standard form in step 107. If the amortization schedule was transformed in step 106, the payment schedule is transformed into standard form in step 108.

In either case, after step 107 or 108, all terms and covenants are put into standard form (step 109).

The processing unit then defines a measure of the inflation rate consistent with the standardized rate of return (e.g., the effective annual rate of inflation) utilizing the specified inflation measure and base period (step 110).

After the processing unit has put the primary components of the desired constant-dollar financial instrument into standardized form and defined the inflation measure, it converts all of the primary components into equivalent nominal-dollar components, thus creating an equivalent nominal-dollar financial instrument LDB WFP (steps 111-119). WFP, LDB The equivalent nominal-dollar interest rate, $r_t$, for every adjustment period t is defined as a function of the measure of inflation, $I_t$, for that adjustment period t; and the constant-dollar rate of return, $R_t$, for adjustment period t (step 111) WFP, LDB $$r_t = (1 + R_t) \cdot (1 + I_t) - 1$$

$$t = 1, \ldots, y \cdot n \qquad \text{(equation 1)}$$

To convert the constant-dollar payment and amortization schedules into equivalent nominal-dollar schedules, the first step is to determine whether or not the constant-dollar schedules, the first step is to determine whether or not the constant-dollar rate of return is fixed (step 112). If the constant-dollar rate of return is fixed, the next step is to determine whether or not the constant-dollar payments are fixed and the number of payment periods exceeds the number adjustment periods (e.g., a constant-dollar mortgage with monthly payments and annual adjustments for inflation (step 113).

If either the constant-dollar payments are not fixed or the number of adjustment periods is equal to or greater than the number of payment periods, then the equivalent nominal-dollar payment schedule is determined according to step 115.

If the constant-dollar payments are fixed and the number of payment periods is greater than the number of adjustment periods, then equivalent nominal-dollar payments are generated which are constant (in nominal dollars) within adjustment periods (step 114).

If the constant-dollar rate of return is not constant (step 112), the next step is to determine whether or not the amortization schedule is fixed (step 113a). If the amortization schedule is fixed, then the constant-dollar payment schedule will vary with the variable constant-dollar rate of the return, and the next step (step 116) is to generate the equivalent nominal-dollar amortization schedule.

If the amortization schedule varies with the variable constant-dollar rate of return and the constant-dollar payments are fixed (step 113a), then the next step is to determine the equivalent nominal-dollar payments according to step 115.

If the payment schedule is generated in steps 114 or 115, the nominal-dollar amortization schedule is generated (step 117). If the nominal-dollar amortization schedule was generated in step 116, then the nominal-dollar payment schedule is generated (step 118).

The system then searches the terms and covenants for any numbers defined in constant-dollars and redefines them as equivalent nominal-dollars for every adjustment period t (step 119).

The system goes through the array of terms and covenants searching for conditions expressed in terms of constant dollars. Whenever the system finds conditions expressed in terms of constant dollars, the system redefines the conditions in equivalent nominal-dollar terms for each adjustment period, utilizing the measure of the inflation rate for all adjustment periods up to and including that adjustment period. The equivalent nominal-dollar amount is defined by an equation similar to equation 2 (below), where $P_t$ would be replaced by the constant-dollar amount from the term or covenant and $p_t$ would become the nominal-dollar equivalent for each adjustment period.

The system then defines the equivalent nominal-dollar financial instrument by printing out primary components in equivalent nominal-dollar form in a format consistent with the preparation of notes and other legal documents (step 120).

Referring to step 115, if the number of payments per year, x, is equal to the number of inflation adjustments per year, y, then the equivalent nominal-dollar payment schedule is defined as follows:

$$p_t = P_t \cdot \prod_{i=1}^{t} (1 + I_i)^{1/y} \qquad \text{(equation 2)}$$

$$t = 1, \ldots, y \cdot n$$

In equation 2, $p_t$ is the equivalent nominal-dollar payment in adjustment period t; $P_t$ is the constant-dollar payment in adjustment period t; $I_i$ is the inflation rate in adjustment period i; and n is the maturity of the instrument in years.

There will not be a case in which x is less than y because the initial standardization routine defines a constant-dollar payment of zero constant-dollars for every adjustment period without a scheduled payment.

Referring to step 114, if, as will commonly be the case for mortgages and term loans, the constant-dollar instrument is fully amortized over n years with equal constant-dollar payments x times per year (x=12 for monthly payments), and the number of adjustments for inflation each year, y, is less than x (y=1 for annual adjustments and y=2 for semi-annual adjustments), then the equivalent nominal-dollar payment schedule is defined as follows:

$$P_{t \cdot x/y - i + 1} = \frac{B_0 \cdot (1+R)^{1/y} - 1}{1 - (1+R)^{-n}} \cdot \prod_{j=1}^{t} (1 + I_j)^{1/y} \cdot \left( \frac{(1+r_t)^{1/x} - 1}{(1+r_t)^{1/y} - 1} \right)$$

(equation 3)

$$t = 1, \ldots, y \cdot n \quad i = 1, \ldots x/y$$

In equation 3, $P_t^* x/y - i + 1$, $i = 1, \ldots, x/y$, are the x/y equal nominal-dollar payments in adjustment period t; $B_0$ is the original amount borrowed in constant-dollars; R is the fixed constant-dollar rate of return; $I_j$ is the inflation rate for period j; and $r_t$ is the equivalent nominal-dollar rate of return for adjustment period t.

After the system has defined the equivalent nominal-dollar payment schedule according to the above (steps 114 or 115), it defines the equivalent nominal-dollar amortization schedule as follows (step 117):

$$b_t = b_{t-1} \cdot (1 + r_t)^{1/x} - p_t$$

$$t = 1, \ldots, x \cdot n \quad \text{(equation 4)}$$

In equation 4, $b_t$ is the scheduled nominal-dollar loan balance in period t; $r_t$ is the equivalent nominal-dollar interest rate in period t; and $p_t$ is the nominal-dollar loan payment in period t.

If the desired constant-dollar financial instrument has a variable constant-dollar rate of return and a fixed constant-dollar amortization schedule, then the instrument will have a variable constant-dollar payment schedule.

In the case of a variable constant-dollar payment schedule, the system defines the equivalent nominal-dollar amortization schedule (step 116) before defining the equivalent nominal-dollar payment schedule (step 118).

In the case of a variable constant-dollar payment schedule, the equivalent nominal-dollar amortization schedule (step 116) is defined as follows:

$$b_t = B_t \cdot \prod_{i=1}^{t} (1 + I_i)^{1/x};$$

(equation 5)

$$t = 1, \ldots, x \cdot n$$

In equation 5, $b_t$ is the scheduled nominal-dollar loan balance for period t; $B_t$ is the scheduled constant-dollar loan balance for period t; and $I_i$ is the inflation rate for period i.

The equivalent nominal-dollar payment schedule (step 118) is then defined as follows:

$$P_t = (1 + r_t)^{1/x} \cdot b_{t-1} - b_t$$

$$t = 1, \ldots, x \cdot n \quad \text{(equation 6)}$$

In equation 6, $P_t$ is the nominal-dollar payment in period t; $r_t$ is the equivalent nominal-dollar rate of return in period t; and $b_t$ is the equivalent nominal-dollar loan balance in period t.

Servicing the equivalent nominal-dollar financial instruments

Implementation of the desired constant-dollar financial instruments requires a system that services the equivalent nominal-dollar instruments after defining these instruments.

The equivalent nominal-dollar specifications of the primary components of the desired constant-dollar instrument are the basis of servicing the equivalent nominal-dollar instrument as well as the definition of the equivalent nominal-dollar instrument.

Therefore, the data processing system develops the basis of servicing the equivalent nominal-dollar instruments when the system defines the equivalent nominal-dollar instruments.

The first step in the process of servicing the equivalent nominal-dollar instruments is to input the data on payments received and dates of receipt, inflation measures and other required data (step 201).

The system then calculates the current nominal-dollar interest rate according to the specification of the equivalent nominal-dollar rate of return and calculates the current interest (and penalties, if any) given the inputted data and stored data from previous periods (step 202).

The system then calculates the current interest (and penalties, if any), and the portion of the current payment that will go to pay current interest (and penalties, if any), the change in accrued interest from the prior payment period, if applicable, and the new level of accrured interest, if any (step 205).

The system next calculates the change in the outstanding loan balance from the prior period, and the new loan balance (step 206).

The system then checks all loan terms and covenants against the latest inputted data for compliance of the loan with all terms and covenants (step 207).

Compliance with the terms and covenants is a matter of comparing the current inputted data for each term or covenant with the requirements of the term or covenant. For example, is the property (in the case of a mortgage) currently insured as per the loan requirements? Is the net working capital (in the case of corporate financing) currently equal to or greater than the required amount?

The system then calculates the nominal-dollar return for the subsequent payment period according to the specification of the equivalent nominal-dollar return (step 208).

The system calculates the nominal-dollar return for the subsequent payment period utilizing the inflation data for the period and equation 1).

Next, the system determines whether the instrument has a fixed constant-dollar rate of return (step 209). If it is determined in step 209 that there is a fixed constant-dollar rate of return or a variable constant-dollar return with fixed constant-dollar payments, the system calculates the nominal-dollar payment for the subsequent payment period as per the equivalent nominal-dollar payment specification (step 210).

After calculating the specified equivalent nominal-dollar payment for the subsequent payment period in step 210, the system then adds any unpaid amounts from previous payment periods (step 213) and any unpaid late payment penalties, if any, to obtain the total nominal-dollar payment required for the subsequent payment period (step 215).

If it is determined at step 209 that there is not a fixed constant-dollar rate of return, the processor determines if the instrument has a variable constant-dollar rate of return and a fixed amortization schedule (step 211). If so, the system first calculates the nominal-dollar amortization amount for the subsequent payment period as per the equivalent nominal-dollar amortization schedule (step 212). Then the system calculates, in step 214, the required nominal-dollar payment for the subsequent payment period, given the current loan balance, the equivalent nominal-dollar rate of return for the subsequent period and the specified nominal-dollar loan amortization calculated in step 212. Next, late payment penalties, if any, are calculated and added to the amount determined in step 214 to obtain the total amount of the nominal-dollar payment for the subsequent period (step 215).

In step 216, the system prints out, in a desired format, the following items:

1. The current nominal-dollar rate of return.
2. The current interest (and penalties, if any) due.
3. The payment amount and the amount of the payment being utilized for payment of current interest (and penalties, if any).
4. The change in the amount of accrued interest from the prior payment period, if applicable, and the new level of accrued interest, if any.
5. The change in the outstanding loan balance from the prior payment period, and the current loan balance.
6. A list of the loan terms and/or covenants, if any, with which the loan is not currently in compliance, and the supporting data therefor.
7. All current financial data required to be supplied by the borrower.
8. The equivalent nominal-dollar return for the subsequent payment period.
9. The required payment for the subsequent payment period.

Gains from employing the invention

As discussed in the background of the invention section, the gains from employing the invention are based on the application of the "matching principle." The inventors have established that significant gains—as compared to the utilization of conventional nominal-dollar instruments—result when the invention is used to implement constant-dollar instruments specified according to the "matching principle."

In order to highlight some of the advantages of the present invention over conventional mortgages, three spreadsheets are included in the drawings as FIGS. 3, 4 and 5. Each of the sample spreadsheets assumes a $10,000,000 purchase price, a $7,500,000 loan, $900,000 of net operating income (NOI) at time of purchase, a capitalization (CAP) rate at purchase of 9.00% and a market CAP rate of 9.00%. In FIG. 3, a steady inflation rate of 4.00% is assumed. In FIG. 4, an initial inflation rate of 4.00% is used but a drop to 2.00% is used beginning year 2. In FIG. 5, an inflation rate of 4.00% initially is changed to 6, 8 and finally 10.00%.

These scenarios exemplify the advantages of the present invention in increasing the expected rate of return for final users of funds (FIG. 3, the steady inflation scenario, which is the expected scenario) and in simultaneously reducing their risk by reducing the impact of unknown future inflation on expected returns (FIGS. 3, 4 and 5 with steady, falling and rising inflation scenarios respectively).

The Figures also demonstrate the reduction in default risk as measured by minimum interest coverage ratios and the high "Real" (net of inflation) returns that the present invention makes possible for final providers of funds. Even after expenses of servicing the loans and managing the portfolio of investments, final providers can expect "Real" returns in excess of 4% from a portfolio of high quality 5% RealValue TM instruments.

For final providers of funds (households) and their agents (especially pension funds), the availability of the instruments made possible by the invention would LOB WFP significantly increase their expected returns and lower their risks.

The invention will allow providers of funds to more than double their expected "Real" LDB WFP returns as compared to high quality nominal-dollar debt instruments. Providers of funds can expect "Real" (net of inflation) returns in excess of 4% from investments in high quality, low default risk Real Value TM (i.e., equivalent nominal-dollar instruments produced by the invention) securities.

This is over twice the long-term average "Real" return achieved by investing in high quality corporate bonds as computed by Ibbotson and Sinquefield for the period 1926–1977 and extended by Ibbotson to 1985.

The invention will allow providers of funds to reduce all of their components of risk at the same time that they are increasing their expected returns.

Default risk will be significantly reduced because debt coverage ratios will rise significantly (see columns h and i of the spreadsheets).

Market risk, which is largely interest rate risk in the case of high quality debt instruments, will be greatly reduced because "Real," or constant-dollar interest rates are much less variable than are nominal-dollar interest rates.

The single most important measure of risk for providers of funds—the standard deviation of the "Real" rate of return—will be reduced to less than one percent for portfolios of high quality RealValue TM instruments, making RealValue TM instruments much less risky than Treasury Bills by this key measure of risk.

Portfolio risk will be reduced because the returns on RealValue TM instruments will be uncorrelated with the returns on other investments.

Currency risk will be reduced for international investors because constant-currency instruments will eliminate the major factor in long-term currency risk—differential inflation rates.

Final users of funds will enjoy significantly higher expected returns and lower risk as a result of the availability of the instruments made possible by the invention.

The higher returns and lower risk are the result of the superior matches between debt service and income made possible by the invention and the (related) superior match between amortization and the value of assets being financed.

Debt coverage ratios are higher and more stable (default risk is an increasing function of the lowest debt coverage ratios expected over the life of the loan), reducing default risk significantly (see columns h and i of the spreadsheets).

Users of funds are able to maintain higher average leverage (see columns u and v of the spreadsheets) increasing their expected returns, at the same time that default risk is reduced through higher debt coverage ratios.

In the stable inflation scenario (Spreadsheet 1), the result is a more than 30% increase (from 11.16% to 14.60%) in the expected "Real" after-tax return to the final user of funds in the stable inflation case.

RealValue TM financing increases its expected return advantage in the case of falling inflation (Spreadsheet 2) and maintains a reduced expected return advantage in the case of sharply rising inflation (Spreadsheet 3).

RealValue TM financing reduces the inflation risk faced by final users of funds because it reduces the variation in their expected "Real" after-tax returns caused by variations in inflation (see Spreadsheets 1, 2 and 3)—this lower "Real" risk is the result of the fixed "Real" rate of interest.

Variations

This invention is applicable to instruments denominated in any currency.

At any point where the word "dollar" appears, any currency name (e.g., marks, francs, pounds, etc.) may be substituted.

The invention makes possible the general utilization of constant-currency financial instruments in any country with any currency.

What has been described by the foregoing is preferred embodiment of the present invention. Various modifications can be made and will be readily apparent to one of ordinary skill in the art. The invention is limited only by the claims appended hereto.

We claim:

1. An apparatus for producing a standard form constant-dollar financial instrument expressed in equivalent nominal-dollar terms, comprising:
    input means for inputting input data to specify a constant-dollar financial instrument, including primary components of the specified constant-dollar financial instrument, and a measure of inflation, base period and frequency of adjustment for inflation to be used, said primary components comprising an interest rate or rate of return specification, said specification including the convention chosen to express the interest rate or rate of return;
    first memory means for storing the input data entered through said input means;
    second memory means for storing a standard form for the primary components of the specified constant-dollar financial instrument, including a standard convention for expressing the interest rate or rate of return;
    detecting means for detecting in said first memory means primary components of the financial instrument that include constant-dollar figures;
    comparison means for comparing the form of the detected primary components with the stored standard form, including a comparison of the input interest rate or rate of return specification with said standard convention;
    determining means for determining appropriate bases for transforming any non-standard primary components of the instrument into said standard form, including bases for transforming the input interest rate or rate of return specification into said standard convention;
    first converting means for converting the non-standard primary components of the instrument into said standard form utilizing said transformation bases;
    defining means for defining a measure of inflation consistent with said standard convention utilizing the input measure of inflation and base period;
    second converting means for converting the standard form primary components of the instrument into equivalent nominal dollar components based upon the defined measure of inflation; and
    output means for outputting a constant-dollar financial instrument expressed in equivalent nominal-dollar terms, corresponding to said input data.

2. The apparatus of claim 1 wherein said primary components comprise rate of return, payment schedule, amortization schedule, terms and covenants.

3. The apparatus of claim 1 wherein said primary components comprise a rate of return component, said apparatus further comprising means for transforming the rate of return component of the specified constant-dollar instrument into an effective annual rate of interest.

4. The apparatus of claim 1 further comprising means for searching terms and covenants of the specified constant-dollar instrument stored in said first memory means for any figures defined in constant-dollars and using said frequency of adjustment for inflation and said measure of inflation, converting said constant-dollar figures into equivalent nominal-dollar figures for every adjustment period.

5. A method for producing with an automated data processing system a constant-dollar financial instrument expressed in equivalent nominal-dollar terms, comprising the steps of:
    inputting input data to specify a constant-dollar financial instrument, including primary components of the specified constant-dollar instrument, and a measure of inflation, base period and frequency of adjustment for inflation to be used, said primary components comprising an interest rate or rate of return specification, said specification including the convention chosen to express the interest rate or rate of return;
    storing in a first memory the input data entered through said input means;
    detecting in said first memory primary components of the financial instrument that include constant-dollar figures;
    comparing the form of the detected primary components with a stored standard form, including comparing the input interest rate or rate of return specification with said standard convention;
    determining appropriate bases for transforming any non-standard primary components of the instrument into said standard form, including bases for transforming the input interest rate or rate of return specification into said standard convention;
    converting the non-standard primary components into the standard form utilizing the transformation bases;
    defining a measure of inflation consistent with said standard convention utilizing the input measure of inflation and the base period;
    converting the standard form primary components of the instrument into equivalent nominal-dollar components based upon the defined measure of inflation; and outputting a constant-dollar financial instrument expressed in equivalent nominal-dollar terms, corresponding to said input data.

6. The method of claim 5 wherein the step of outputting the primary components of the equivalent nominal-dollar financial instrument comprises the steps of outputting the rate of return, payment schedule, amortization schedule terms and covenants.

7. The method of claim 5 wherein said primary components comprise a rate of return component, further comprising the step of transforming the rate of return component of the specified constant-dollar instrument into an effective annual rate of interest.

8. The method of claim 5 further comprising the step of searching terms and covenants of the specified constant-dollar instrument stored in said first memory for any figures defined in constant-dollars and using said frequency of adjustment for inflation and said measure of inflation, converting said constant-dollar figures into equivalent nominal-dollar figures for every adjustment period.

9. An apparatus for converting a constant-dollar financial instrument into an equivalent nominal-dollar instrument comprising:
   input means for inputting input data to specify a constant-dollar financial instrument, including primary components of the specified constant-dollar financial instrument, and a measure of inflation, base period and frequency of adjustment for inflation to be used, said primary components comprising an interest rate or rate of return specification, said specification including the convention chosen to express the interest rate or rate of return;
   first memory means for storing the input data entered through said input means;
   second memory means for storing a standard form for the primary components of the specified constant-dollar financial instrument, including a standard convention for expressing the interest rate or rate of return;
   comparison means for comparing the form of the primary components entered through said input means with the stored standard form, including a comparison of the input interest rate or rate of return specification with said standard convention;
   first converting means for converting any non-standard primary components of the instrument into said standard form and defining a measure of inflation consistent with said standard convention utilizing the input measure of inflation and base period, said first converting means comprising means for generating a constant-dollar payment schedule and a constant-dollar amortization schedule for the specified constant-dollar financial instrument;
   second converting means for converting the specified constant-dollar financial instrument into an equivalent nominal-dollar instrument by converting the standard form primary components of the instrument into equivalent nominal dollar components based upon the defined measure of inflation; and
   output means for outputting output data relating to the equivalent nominal-dollar instrument, including said equivalent nominal dollar components.

10. The apparatus of claim 9 wherein said converting means converts the specified constant-dollar financial instrument into an equivalent nominal-dollar instrument by calculating an equivalent nominal-dollar interest rate, converting the constant-dollar payment schedule into an equivalent nominal-dollar payment schedule and determining the equivalent nominal-dollar amortization schedule.

11. The apparatus of claim 10 wherein said equivalent nominal-dollar interest rate, $r_t$, is defined by the following formula:

$$r_t = (1+R_t)\cdot(1+I_t) - 1;$$

for $t = 1, \ldots, y\cdot n;$ where t is the adjustment period, $I_t$ is a measure of inflation for the adjustment period t and $R_t$ is the constant-dollar rate of return for adjustment period t.

12. The apparatus of claim 10 wherein when the specified constant-dollar financial instrument has a number of payments per period equal to the number of adjustments per period, the nominal-dollar payment schedule is defined as follows:

$$p_t = P_t \cdot \prod_{i=1}^{t} (1 + I_i)^{1/y}$$

$$t = 1, \ldots, y\cdot n$$

where $p_t$ is the equivalent nominal-dollar payment in adjustment period t; $P_t$ is the constant-dollar payment in adjustment period t; $I_i$ is the inflation rate in adjustment period i; n is number of periods to maturity of the instrument; and y equals the number of inflation adjustments per period.

13. The apparatus of claim 10 wherein when the specified constant-dollar instrument is specified to be fully amortized over n periods with equal constant-dollar payments x times per period, and the number, y, of adjustments for inflation each period is less than x, the equivalent nominal-dollar payment schedule is defined as follows:

$$P_{t\cdot x/y-i+1} = \frac{B_o \cdot (1+R)^{1/y} - 1}{1 - (1+R)^{-n}} \cdot$$

$$\prod_{j=1}^{t} (1 + I_j)^{1/y} \cdot \left( \frac{(1+r_t)^{1/x} - 1}{(1+r_t)^{1/y} - 1} \right)$$

$$t = 1, \ldots y\cdot n \quad i = 1, \ldots, x/y$$

where $P_t*x/y-i+1$, $i=1,\ldots,x/y$, are the x/y equal nominal-dollar payments in adjustment period t; $B_o$ is the original amount borrowed in constant-dollars: R is the fixed constant-dollar rate of return; $I_j$ is the inflation rate for period j; and $r_t$ is the equivalent nominal-dollar rate of return for adjustment period t.

14. The apparatus of claim 13 wherein the nominal-dollar amortization schedule is defined as follows:

$$b_t = b_{t-1}(1+r_t)^{1/x} - p_t;$$

for $t = 1, \ldots, x\cdot n;$ where $b_t$ is the scheduled nominal-dollar loan balance in period t; $r_t$ is the equivalent nominal-dollar interest rate in period t; and $p_t$ is the nominal-dollar loan payment in period t; and $b_{t-1}$ is the nominal dollar loan balance for the previous period.

15. The apparatus of claim 10 wherein when the specified constant-dollar financial instrument has a variable constant-dollar rate of return and a fixed constant-dollar amortization schedule, the converting means determines the equivalent nominal-dollar amortization schedule before converting the constant-dollar payment schedule into an equivalent nominal-dollar payment schedule.

16. The apparatus of claim 15 wherein the equivalent nominal-dollar amortization schedule is defined as follows:

$$b_t = B_t \cdot \prod_{i=1}^{t} (1 + I_i)^{1/x}$$

$$t = 1, \ldots x \cdot n$$

where $b_t$ is the scheduled nominal-dollar loan balance for period t; $B_t$ is the scheduled constant-dollar loan balance for period t; and $I_i$ is the inflation rate for period i; and x is the number of payments per period.

17. The apparatus of claim 16 wherein the nominal-dollar payment schedule is defined as follows:

$$P_t = (1 + r_t)^{1/x} \cdot b_{t-1} - b_t;$$

$$t = 1, \ldots, x \cdot n$$

where $P_t$ is the nominal-dollar payment in period t; $r_t$ is the equivalent nominal-dollar rate of return in period t; and $b_t$ is the equivalent nominal-dollar loan balance in period t.

18. The apparatus of claim 10 further comprising determining means for determining if the specified constant-dollar instrument has a fixed rate of return.

19. The method of claim 9 wherein the step of converting the specified constant-dollar financial instrument into an equivalent nominal-dollar instrument comprises the steps of calculating an equivalent nominal-dollar interest rate, converting the constant-dollar payment schedule into an equivalent nominal-dollar payment schedule and determining the equivalent nominal amortization schedule.

20. The method of claim 19 wherein said equivalent nominal-dollar interest rate $r_t$ is calculated by using the following formula:

$$r_t = (1 + R_t) \cdot (1 + I_t) - 1;$$

for $t = 1, \ldots, y \cdot n;$ where t is the adjustment period, $I_t$ is a measure of inflation for the adjustment period t and $R_t$ is the constant-dollar rate of return for adjustment period t.

21. The method of claim 19 wherein when the specified constant-dollar financial instrument has a number of payments per period equal to the number of adjustments per period, the nominal-dollar payment schedule is calculated according to the following formula:

$$p_t = P_t \cdot \prod_{i=1}^{t} (1 + I_i)^{1/y};$$

$$t = 1, \ldots y \cdot n$$

where $p_t$ is the equivalent nominal-dollar payment in adjustment period t; $P_t$ is the constant-dollar payment in adjustment period t; $I_i$ is the inflation rate in period i; n is number of periods to maturity of the instrument; and y equals the number of inflation adjustments per period.

22. The method of claim 19 wherein when the specified constant-dollar financial instrument is fully amortized over n periods with equal constant-dollar payments x times per period, and the number, y, of adjustments for inflation each period less than x, the equivalent nominal-dollar payment schedule is calculated by using the following formula:

$$P_{t \cdot x/y - i + 1} = \frac{B_o \cdot (1 + R)^{1/y} - 1}{1 - (1 + R)^{-n}} \cdot$$

$$\prod_{j=1}^{t} (1 + I_j)^{1/y} \cdot \left( \frac{(1 + r_t)^{1/x} - 1}{(1 + r_t)^{1/y} - 1} \right)$$

$$t = 1, \ldots, y \cdot n \quad i = 1, \ldots, x/y$$

where $P_t * x/y - i + 1$, $i = 1, \ldots, x/y$, are the x/y equal nominal-dollar payments in adjustment period t; $B_o$ is the original amount borrowed in constant-dollars: R is the fixed constant-dollar rate of return; $I_j$ is the inflation rate for adjustment period j; and $r_t$ is the equivalent nominal-dollar rate of return for adjustment period t.

23. The method of claim 22 wherein the nominal-dollar amortization schedule is calculated by using the following formula:

$$b_t = b_{t-1}(1 + r_t)^{1/x} - p_t;$$

for $t = 1, \ldots, x \cdot n;$ where $b_t$ is the scheduled nominal-dollar loan balance in period t; $r_t$ is the equivalent nominal-dollar interest rate in period t; and $p_t$ is the nominal-dollar loan payment in period t; and $b_{t-1}$ is the nominal dollar loan balance for the previous period.

24. The method of claim 19 wherein when the specified constant-dollar financial instrument has a variable constant-dollar rate of return and a fixed constant-dollar amortization schedule, the step of calculating the equivalent nominal-dollar amortization schedule is performed before the step of converting the constant-dollar payment schedule into an equivalent nominal-dollar payment schedule.

25. The method of claim 24 wherein the equivalent nominal-dollar amortization schedule is calculated by using the following formula:

$$b_t = B_t \cdot \prod_{i=1}^{t} (1 + I_i)^{1/x};$$

$$t = 1, \ldots, x \cdot n$$

where $b_t$ is the scheduled nominal-dollar loan balance for period t; $B_t$ is the scheduled constant-dollar loan balance for period t; and $I_i$ is the inflation rate for period i; and x is the number of payments per period.

26. The method of claim 25 wherein the nominal-dollar payment schedule is calculated using the following formula:

$$P_t = (1 + r_t)^{1/x} \cdot b_{t-1} - b_t;$$

$$t = 1, \ldots, x \cdot n$$

where $P_t$ is the nominal-dollar payment in period t; $r_t$ is the equivalent nominal-dollar rate of return in period t; and $b_t$ is the equivalent nominal-dollar loan balance in period t.

27. The method of claim 19 further comprising the steps of determining if the specified constant-dollar instrument has a fixed rate of return.

28. A method for converting a constant-dollar financial instrument into an equivalent nominal-dollar instrument comprising the steps of:

inputting input data to specify a constant-dollar financial instrument, including primary component data of the specified constant-dollar instrument, and a measure of inflation, base period and frequency of adjustment for inflation to be used, said primary component data comprising an interest rate or rate or return specification, said specification including the convention chosen to express the interest rate or rate of return;

storing in a first memory the input data entered through said input means;

comparing the form of the primary component data with a stored standard form, including comparing the input interest rate or rate of return specification with a stored standard convention for expressing the interest rate or rate of return;

converting any non-standard primary components into the standard form and defining a measure of inflation consistent with said standard convention utilizing the input measure of inflation and base period, said converting comprising the step of generating a constant-dollar payment schedule and a constant-dollar amortization schedule for the specified constant-dollar financial instrument;

converting the specified constant-dollar financial instrument into an equivalent nominal-dollar instrument by converting the standard form primary components of the instrument into equivalent nominal-dollar components based upon the defined measure of inflation; and outputting output data relating to the equivalent nominal-dollar instrument, including said equivalent nominal-dollar components.

29. An apparatus for converting a constant-dollar financial instrument into an equivalent nominal-dollar instrument comprising:

input means for inputting input data to specify a constant-dollar financial instrument, including primary components of the specified constant-dollar financial instrument, and a measure of inflation, base period and frequency of adjustment for inflation to be used, said primary components comprising an interest rate or rate of return specification, said specification including the convention chosen to express the interest rate or rate of return;

first memory means for storing the input data entered through said input means;

second memory means for storing a standard form for the primary components of the specified constant-dollar financial instrument, including a standard convention for expressing the interest rate or rate or return;

comparison mean for comparing the form of the primary components entered through said input means with the stored standard form, including a comparison of the input interest rate or rate of return specification with said standard convention;

first converting means for converting any non-standard primary components of the instrument into said standard form and defining a measure of inflation consistent with said standard convention utilizing the input measure of inflation and base period;

second converting means for converting the specified constant-dollar financial instrument into an equivalent nominal-dollar instrument by converting the standard form primary components of the instrument into equivalent nominal dollar components based upon the defined measure of inflation;

output means for outputting output data relating to the equivalent nominal-dollar instrument, including said equivalent nominal dollar components; and loan servicing means for servicing received loan payments and other transactions, comprising output means for outputting data comprising one or more of the following:

the current nominal-dollar return;

the current interest and penalties due;

the payment amount and the portion of the payment to be used for payment of current interest and penalties;

the change in the amount of accrued interest from the prior payment and the new level of accured interest;

the change in the outstanding loan balance from the prior payment period;

the current loan balance;

a list of any loan terms with which the loan is not currently in compliance, and supporting data therefor;

current financial data required to be supplied by the borrower;

the nominal-dollar return for the subsequent payment period; and the required payment of the subsequent payment period.

30. A method for converting a constant-dollar financial instrument into an equivalent nominal-dollar instrument comprising the steps of:

inputting input data to specify a constant-dollar financial instrument, including primary component data of the specified constant-dollar instrument, and a measure of inflation, base period and frequency of adjustment for inflation to be used, said primary component data comprising an interest rate or rate of return specification, said specification including the convention chosen to express the interest rate or rate or return;

storing in a first memory the input data entered through said input means;

comparing the form of the primary component data with a stored standard form, including comparing the input interest rate or rate of return specification with a stored standard convention for expressing the interest rate or rate of return;

converting any non-standard primary components into the standard form and defining a measure of inflation consistent with said standard convention utilizing the input measure of inflation and base period;

converting the specified constant-dollar financial instrument into an equivalent nominal-dollar instrument by converting the standard form primary components of the instrument into equivalent nominal-dollar components based upon the defined measure of inflation; and outputting output data relating to the equivalent nominal-dollar instrument, including said equivalent nominal-dollar components; and servicing received payments and other transactions concerning the specified financial instrument, said servicing comprising the step of outputting servicing data comprising one or more of the following:

the current nominal-dollar return;

the current interest and penalties due;

the payment amount and the portion of the payment to be used for payment of current interest and penalties;

the change in the amount of accrued interest from the prior payment and the new level of accured interest;

the change in the outstanding loan balance from the prior payment period;

the current loan balance;

a list of any loan terms with which the loan is not currently in compliance, and supporting data therefor;

current financial data required to be supplied by the borrower;

the nominal-dollar return for the subsequent payment period; and the required payment of the subsequent payment period.

31. An apparatus for servicing a constant-dollar financial instrument expressed in equivalent nominal dollar terms, comprising:

first memory means for storing data specifying in equivlent nominal dollar terms the constant dollar financial instrument, including nominal dollar equivalent specifications of the rate of return or rate of interest and at least one of a payment schedule and amortization schedule of the constant-dollar financial instrument, and a measure of inflation, base period and frequency of adjustment for inflation to be used; and updating means for periodically updating current data of the instrument in nominal dollar terms, said updating means comprising:

input means for inputting actual transaction data relating to the instrument, including payment amounts and dates of receipt, and inflation measure data;

second memory means for storing the actual transaction data and inflation measure data input through said input means;

first calculating means for calculating a nominal dollar rate of interest or rate of return figure applicable for a subsequent inflation adjustment period, based on the nominal dollar equivalent specification of the rate of interest or rate of return stored in said first memory means, and inflation measure data for said subsequent inflation adjustment period stored in said second memory means;

second calculating means for calculating a scheduled payment amount for a subsequent payment period, based on the nominal dollar equivalent specifications of the instrument stored in said first memory means, and inflation measure data stored in said second memory means;

third memory means for storing the nominal dollar rate of interest or rate of return figure calculated by said first calculating means, the scheduled payment amount calculated by said second calculating means, and a total required nominal dollar payment amount for a previous payment period immediately preceding said subsequent payment period;

comparing means for comparing, respectively, the payment amounts and dates of receipt stored in said second memory means with the total required nominal dollar payment amount stored in said third memory means, and a scheduled payment date, for said previous payment period;

first determining means for determining any unpaid payment amount from said previous payment period, and penalties to be applied, based upon the comparison of said comparing means, said first determining means including means for checking penalty provisions of the instrument to determine said penalties to be applied, if any;

third calculating means for calculating a total required nominal dollar payment for the subsequent payment period by adding to the scheduled payment amount for that period stored in said third memory means any unpaid payment amounts and penalties determined by said first determining means; and output means for outputting servicing data, including the nominal dollar rate of interest or rate of return applicable for said subsequent payment period, penalties applied from the previous payment period as determined by said first determining means, and the total required nominal dollar payment calculated by said third calculating means.

32. The apparatus of claim 31, wherein the data stored in said first memory means specifies in nominal dollar terms a rate of return or rate of interest of the constant dollar financial instrument as follows:

$$r_t = (1+R_t)\cdot(1+I_t) - 1;$$

for $t = 1, \ldots, y''n;$ where t is the inflation adjustment period, $I_t$ is a measure of inflation for the adjustment period t and $R_t$ is the constant-dollar rate of return or rate of interest for adjustment period t.

33. The apparatus of claim 31, wherein the data stored in said first memory means specifies in nominal dollar terms a constant dollar financial instrument having a number of payments per period equal to the number of inflation adjustments per period, and defines a nominal dollar payment schedule as follows:

$$p_t = P_t \cdot \prod_{i=1}^{t} (1 + I_i)^{1/y}$$

$$t = 1, \ldots, y \cdot n$$

where $p_t$ is the equivalent nominal-dollar payment in inflation adjustment period t; $P_t$ is the constant-dollar payment in adjustment period t; $I_i$ is the inflation rate in adjustment period i; n is the number of periods to maturity of the instrument; and y equals the number of inflation adjustments per period.

34. The apparatus of claim 31, wherein the data stored in said first memory means specifies in nominal dollar terms a constant dollar financial instrument to be fully amortized over n periods with equal constant-dollar payments x times per period, the number, y, of adjustments for inflation each period being less than x, and defines a nominal dollar payment schedule as follows:

$$P_{t \cdot x/y - i + 1} = \frac{B_o \cdot (1 + R)^{1/y} - 1}{1 - (1 + R)^{-n}} \cdot$$

$$\prod_{j=1}^{t} (1 + I_j)^{1/y} \cdot \left( \frac{(1 + r_t)^{1/x} - 1}{(1 + r_t)^{1/y} - 1} \right)$$

$$t = 1, \ldots y \cdot n \quad i = 1, \ldots, x/y$$

where $P_{t \cdot x/y - i + 1}$, $i = 1, \ldots, x/y$, are the x/y equal nominal-dollar payments in adjustment period t; $B_o$ is the original amount borrowed in constant-dollars; R is the fixed constant-dollar rate of return or rate of interest; $I_j$ is the inflation rate for period j; and $r_t$ is the equivalent nominal-dollar rate of return or rate of interest for adjustment period t.

35. The apparatus of claim 34, wherein the data stored in said first memory means further defines in nominal-dollar terms an amortization schedule of the constant-dollar financial instrument as follows:

$$b_t = b_{t-1}(1 + r_t)^{1/x} - p_t;$$

for $t = 1, \ldots, x''n;$ where $b_t$ is the scheduled nominal-dollar loan balance in period t; $r_t$ is the equivalent nominal-dollar interest rate in period t; $p_t$ is the nominal-dollar loan payment in period t; and $b_{t-1}$ is the nominal dollar loan balance for the previous period.

36. The apparatus of claim 33, wherein the data stored in said first memory means further defines in nominal-dollar terms an amortization schedule of the constant-dollar financial instrument as follows:

$$b_t = b_{t-1}(1 + r)^{1/x} p_t;$$

for $t = 1, \ldots, x''n;$ where $b_t$ is the scheduled nominal-dollar loan balance in period t; $r_t$ is the equivalent nominal-dollar interest rate in period t; $p_t$ is the nominal-dollar loan payment in period t; and $b_{t-1}$ is the nominal dollar loan balance for the previous period.

37. The apparatus or claim 31, wherein the data stored in said first memory means specifies in nominal dollar terms a constant-dollar financial instrument having a variable constant-dollar rate of return or rate of interest and a fixed constant-dollar amortization schedule defined as follows:

$$b_t = B_t \cdot \prod_{i=1}^{t} (1 + I_i)^{1/x}$$

$$t = 1, \ldots x \cdot n$$

where $b_t$ is the scheduled nominal-dollar loan balance for period t; $B_t$ is the scheduled constant-dollar loan balance for period t; $I_i$ is the inflation rate for period i; and x is the number of payments per period.

38. The apparatus of claim 37, wherein the data stored in said first memory means further defines a nominal dollar payment schedule of the constant-dollar financial instrument as follows:

$$P_t = (1 + r_t)^{1/x} \cdot b_{t-1} - b_t;$$

$$t = 1, \ldots, x \cdot n$$

where $P_t$ is the nominal-dollar payment in period t; $r_t$ is the equivalent nominal dollar rate of return in period t; and $b_t$ is the equivalent nominal-dollar loan balance in period t.

39. The apparatus of claim 31, wherein the data stored in said first memory means specifies, in equivalent nominal dollar terms, terms and covenants of the constant-dollar financial instrument, said input means provides for input of term and covenant compliance data, said second memory means stores the term and covenant compliance data input through said input means, said comparison means compares the term and covenant compliance data stored in said second memory means with the terms and covenants stored in said first memory means, said determining means determines whether there is currently compliance with the terms and covenants of the financial instrument, based upon the comparison of said comparing means, and said output means outputs a list of any terms and covenants that have not been complied with.

40. The apparatus of claim 31, wherein:

the third calculating means calculates a current interest amount and the portion of a current payment that will go to pay the current interest amount and any penalties, a change in accrued interest from the previous payment period, a new level of accrued interest, a change in a loan balance from a previous period, and a new loan balance; and the output means outputs the calculated current interest amount, the payment amount being utilized for payment of the current interest and any penalties, the change in the amount of accrued interest, the new level of accrued interest, the change in the loan balance, and the new loan balance.

41. The apparatus of claim 31, further comprising second determining means for determining whether the constant-dollar financial instrument specified in said first memory means has (1) a fixed constant-dollar rate of return or a variable constant-dollar rate of return with fixed constant-dollar payments, or (2) a variable constant-dollar rate of return and a fixed amortization schedule; and wherein said second calculating means calculates the scheduled payment amount for the subsequent payment period:

utilizing a nominal dollar equivalent specification of a payment schedule stored in said first memory means when the second determining means determines that the constant-dollar financial instrument has a fixed constant-dollar rate of return or a variable constant dollar rate of return with fixed constant dollar payments; and utilizing a nominal dollar equivalent specification of an amortization schedule stored in said first memory means when the second determining means determines that the constant-dollar financial instrument has a variable constant-dollar rate of return and a fixed amortization schedule.

42. A method for servicing with an automated data processing system a constant-dollar financial instrument expressed in equivalent nominal dollar terms, comprising the steps of:

providing a memory storing data specifying in equivalent nominal dollar terms the constant dollar financial instrument, including nominal dollar equivalent specifications of the rate of return or rate of interest and at least one of a payment schedule and amortization schedule of the constant-dollar financial instrument, and a measure of inflation, base period and frequency of adjustment for inflation to be used; and periodically updating current data of the instrument in nominal dollar terms, said updating comprising the steps of:

inputting actual transaction data relating to the instrument, including payment amounts and dates of receipt, and inflation measure data;

storing the input actual transaction data and inflation measure data;

calculating a nominal dollar rate of interest or rate of return figure applicable for a subsequent inflation adjustment period, based on the stored nominal dollar equivalent specification of the rate of interest or rate of return, and stored inflation measure data for said subsequent inflation adjustment period;

calculating a scheduled payment amount for a subsequent payment period, based on the stored nominal dollar equivalent specifications of the instrument, and stored inflation measure data;

storing the calculated nominal dollar rate of interest or rate of return figure, the calculated scheduled payment amount, and a total required nominal dollar payment amount for a previous payment period immediately preceding said subsequent payment period;

comparing, respectively, the stored payment amounts and dates of receipt with the stored total required nominal dollar payment amount, and a scheduled payment date, for said previous payment period;

determining any unpaid payment amount from said previous payment period, and penalties to be applied, based upon the result of the comparing step, said determining step including the step of checking penalty provisions of the instrument to determine said penalties to be applied, if any;

calculating a total required nominal dollar payment for the subsequent payment period by adding to the stored scheduled payment amount for that period any unpaid payment amounts and penalties determined in the determining step; and outputting servicing data, including the nominal dollar rate of interest or rate of return applicable for said subsequent payment period, penalties applied from the previous payment period as determined in the determining step, and the calculated total required nominal dollar payment for the subsequent payment period.

43. The method of claim 42, wherein the data stored in said memory specifies in nominal dollar terms a rate of return or rate of interest of the constant dollar financial instrument as follows:

$$r_t = (1+R_t) \cdot (1+I_t) - 1;$$

for $t = 1, \ldots, y''n;$ where t is the inflation adjustment period, $I_t$ is a measure of inflation for the adjustment period t and $R_t$ is the constant-dollar rate of return or rate of interest for adjustment period t.

44. The method of claim 42, wherein the data stored in said memory specifies in nominal dollar terms a constant dollar financial instrument having a number of payments per period equal to the number of inflation adjustments per period, and defines a nominal dollar payment schedule as follows:

$$p_t = P_t \cdot \prod_{t=1}^{t} (1 + I_t)^{1/y}$$

$$t = 1, \ldots, y \cdot n$$

where $p_t$ is the equivalent nominal-dollar payment in inflation adjustment period t; $P_t$ is the constant-dollar payment in adjustment period t; $I_i$ is the inflation rate in adjustment period i; n is the number of periods to maturity of the instrument; and y equals the number of inflation adjustments per period.

45. The method of claim 42, wherein the data stored in said memory specifies in nominal dollar terms a constant dollar financial instrument to be fully amortized over n periods with equal constant-dollar payments x times per period, the number, y, of adjustments for inflation each period being less than x, and defines a nominal dollar payment schedule as follows:

$$P_{t \cdot x/y - i + 1} = \frac{B_o \cdot (1 + R)^{1/y} - 1}{1 - (1 + R)^{-n}} \cdot$$

$$\prod_{j=1}^{t} (1 + I_j)^{1/y} \cdot \left( \frac{(1 + r_t)^{1/x} - 1}{(1 + r_t)^{1/y} - 1} \right)$$

$$t = 1, \ldots y \cdot n \quad i = 1, \ldots, x/y$$

where $P_{t \cdot x/y - i + 1}$, $i = 1, \ldots, x/y$, are the x/y equal nominal-dollar payments in adjustment period t; $B_o$ is the original amount borrowed in constant-dollars; R is the fixed constant-dollar rate of return or rate of interest; $I_j$ is the inflation rate for period j; and $r_t$ is the equivalent nominal-dollar rate of return or rate of interest for adjustment period t.

46. The method of claim 45, wherein the data stored in said memory further defines in nominal-dollar terms an amortization schedule of the constant-dollar financial instrument as follows:

$$b_t = b_{t-1}(1 + r_t)^{1/x} - p_t;$$

for $t = 1, \ldots, x''n;$ where $b_t$ is the scheduled nominal-dollar loan balance in period t; $r_t$ is the equivalent nominal-dollar interest rate in period t; $p_t$ is the nominal-dollar loan payment in period t; and $b_{t-1}$ is the nominal dollar loan balance for the previous period.

47. The method of claim 44, wherein the data stored in said memory further defines in nominal-dollar terms an amortization schedule of the constant-dollar financial instrument as follows:

$$b_t = b_{t-1}(1 + r)^{1/x} - p_t;$$

for $t = 1, \ldots, x''n;$ where $b_t$ is the scheduled nominal-dollar loan balance in period t; $r_t$ is the equivalent nominal-dollar interest rate in period t; $p_t$ is the nominal-dollar loan payment in period t; and $b_{t-1}$ is the nominal dollar loan balance for the previous period.

48. The method of claim 42, wherein the data stored in said memory specifies in nominal dollar terms a constant-dollar financial instrument having a variable constant-dollar rate of return or rate of interest and a fixed constant-dollar amortization schedule defined as follows:

$$b_t = B_t \cdot \prod_{i=1}^{t} (1 + I_i)^{1/x}$$

$$t = 1, \ldots x \cdot n$$

where $b_t$ is the scheduled nominal-dollar loan balance for period t; $B_t$ is the scheduled constant-dollar loan balance for period t; $I_i$ is the inflation rate for period i; and x is the number of payments per period.

49. The method of claim 48, wherein the data stored in said memory further defines a nominal dollar payment schedule of the constant-dollar financial instrument as follows:

$$P_t = (1 + r_t)^{1/x} \cdot b_{t-1} - b_t;$$

$$t = 1, \ldots, x \cdot n$$

where $P_t$ is the nominal-dollar payment in period t; $r_t$ is the equivalent nominal dollar rate of return in period t; and $b_t$ is the equivalent nominal-dollar loan balance in period t.

50. The method of claim 42, wherein the data stored in said memory specifies, in equivalent nominal dollar terms, terms and covenants of the constant-dollar financial instrument, and said updating further includes the steps of inputting terms and convenant compliance data, storing the input term and covenant compliance data, comparing the stored term and covenant compliance data with the terms and covenants stored in said memory, determining whether there is currently compliance with the terms and covenants of the financial instrument, based upon the comparing step, and outputting a list of any terms and covenants that have not been complied with.

51. The method of claim 42, wherein said updating step further comprising the steps of:

calculating a current interest amount and the portion of a current payment that will go to pay the current interest amount and any penalties, a change in accrued interest from the previous payment period, a new level of accrued interest, a change in a loan balance from a previous period, and a new loan balance; and outputting the calculated current interest amount, the payment amount being utilized for payment of the current interest and any penalties, the change in the amount of accrued interest, the new level of accrued interest, the change in the loan balance, and the new loan balance.

52. The method of claim 42, wherein said updating step further comprises the steps of determining whether the constant-dollar financial instrument specified in said memory has (1) a fixed constant-dollar rate of return or a variable constant-dollar rate of return with fixed constant-dollar payments, or (2) a variable constant-dollar rate of return and a fixed amortization schedule; and calculating the scheduled payment amount for the subsequent payment period:

utilizing a nominal dollar equivalent specification of a payment schedule stored in said memory when it is determined that the constant-dollar financial instrument has a fixed constant-dollar rate of return or a variable constant dollar rate of return with fixed constant dollar payments; and utilizing a nominal dollar equivalent specification of an amortization schedule stored in said memory when it is determined that the constant-dollar financial instrument has a variable constant-dollar rate of return and a fixed amortization schedule.

* * * * *